US 11,996,934 B2

(12) United States Patent
Zhou et al.

(10) Patent No.: US 11,996,934 B2
(45) Date of Patent: *May 28, 2024

(54) BROADCASTING PACKETS USING NETWORK CODING WITH FEEDBACK

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Junyi Li, Franklin Park, NJ (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/315,696

(22) Filed: May 10, 2021

(65) Prior Publication Data

US 2021/0385003 A1    Dec. 9, 2021

Related U.S. Application Data

(60) Provisional application No. 63/036,853, filed on Jun. 9, 2020, provisional application No. 63/036,860, filed on Jun. 9, 2020.

(51) Int. Cl.
*H04W 4/00* (2018.01)
*H04L 1/00* (2006.01)
(Continued)

(52) U.S. Cl.
CPC ............. *H04L 1/0009* (2013.01); *H04W 4/06* (2013.01); *H04W 28/06* (2013.01)

(58) Field of Classification Search
None
See application file for complete search history.

(56) References Cited

U.S. PATENT DOCUMENTS

| 8,385,452 B2 | 2/2013 | Gorokhov |
| 2006/0233256 A1* | 10/2006 | Francois ............... H04N 19/61 |
| | | 375/E7.041 |

(Continued)

FOREIGN PATENT DOCUMENTS

| CN | 103314626 A | 9/2013 | |
| WO | 2010048513 | 4/2010 | |
| WO | WO2011113200 A1 * | 9/2011 | ............... H04L 1/18 |

OTHER PUBLICATIONS

International Search Report and Written Opinion—PCT/US2021/031841—ISA/EPO—dated Aug. 12, 2021 (205418WO).

(Continued)

*Primary Examiner* — Abdelillah Elmejjarmi
(74) *Attorney, Agent, or Firm* — Holland & Hart LLP

(57) ABSTRACT

Methods, systems, and devices for wireless communications are described. A network node may identify a set of packets (e.g., from a packet pool) that are scheduled for broadcast to a plurality of user equipments (UEs) and transmit a set of network encoded packets based on the set of packets. The network node may receive feedback from one or more of the plurality of UEs, and the feedback may indicate successfully decoded packets by each of the one or more UEs. Based on the feedback, the network node may identify an updated set of packets and transmit the updated set. The transmitter may continue to update and transmit based on feedback until the feedback indicates that updated set of packets is empty.

30 Claims, 13 Drawing Sheets

(51) Int. Cl.
H04W 4/06    (2009.01)
H04W 28/06   (2009.01)

(56) References Cited

U.S. PATENT DOCUMENTS

| | | | | |
|---|---|---|---|---|
| 2012/0314655 | A1* | 12/2012 | Xue | H04L 1/0076 |
| | | | | 370/328 |
| 2013/0044794 | A1* | 2/2013 | Wenzel | H04B 1/40 |
| | | | | 375/219 |
| 2015/0333874 | A1* | 11/2015 | Damola | H04L 1/1845 |
| | | | | 370/312 |
| 2017/0347112 | A1* | 11/2017 | Zhang | H04N 19/68 |
| 2018/0102930 | A1* | 4/2018 | Wang | H04L 27/26 |
| 2019/0123849 | A1* | 4/2019 | Baldemair | H04L 1/0009 |
| 2020/0014488 | A1* | 1/2020 | Lyu | H04L 1/0026 |
| 2020/0028624 | A1* | 1/2020 | Fouli | H04L 1/0061 |
| 2020/0120459 | A1 | 4/2020 | Nguyen et al. | |
| 2020/0170065 | A1* | 5/2020 | Xue | H04W 72/23 |
| 2022/0173834 | A1* | 6/2022 | Vidal | H04L 1/0075 |

OTHER PUBLICATIONS

Dai J., et al., "LT Codes with Limited Feedback", 2014 IEEE International Conference on Computer and Information Technology, IEEE, Sep. 11, 2014, pp. 669-673, XP032702894, 5 Pages, Sections I-III, Section III.

* cited by examiner

BROADCASTING PACKETS USING NETWORK CODING WITH FEEDBACK

CROSS REFERENCE

The present Application for Patent claims the benefit of U.S. Provisional Patent Application No. 63/036,853 by ZHOU et al., entitled "BROADCASTING PACKETS USING NETWORK CODING WITH FEEDBACK," filed Jun. 9, 2020, assigned to the assignee hereof, and expressly incorporated by reference herein. The present Application for Patent also claims the benefit of U.S. Provisional Patent Application No. 63/036,860 by ZHOU et al., entitled "BROADCASTING PACKETS USING NETWORK CODING WITH FEEDBACK," filed Jun. 9, 2020, assigned to the assignee hereof, and expressly incorporated by reference herein.

FIELD OF TECHNOLOGY

The following relates generally to wireless communications and more specifically to broadcasting packets using network coding with feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may support broadcasting of packets to a plurality of UEs. The transmitter (e.g., a network node, base station, etc.) may broadcast multiple packets to multiple receivers (e.g., UEs). The broadcasting may be repeated blindly without the transmitters knowledge of packets that have been decoded by the receivers.

SUMMARY

The described techniques relate to improved methods, systems, devices, and apparatuses that support broadcasting packets using network coding with feedback. Generally, the described techniques provide for broadcasting of network coded packets using a design based on feedback. A network node may identify a set of packets (e.g., from a packet pool) that are scheduled for broadcast to a plurality of user equipments (UEs) and transmit a set of network encoded packets based on the set of packets. The network node may receive feedback from one or more of the plurality of UEs, and the feedback may indicate successfully decoded packets by each of the one or more UEs. Based on the feedback, the network node may identify an updated set of packets that excludes successfully decoded packets included each of the subsets and transmit the updated set. The transmitter may continue to update and transmit based on feedback until the feedback indicates that updated set of packets is empty. In some examples, the network node may identify an updated set of packets that excludes any successfully decoded packets included in any of the subsets and transmit the updated set. In some cases, the network node may then transmit an updated first set that excludes successfully decoded packets included in each of the subsets and transmit the updated first set.

A method of wireless communication at a network node is described. The method may include identifying, at the network node, a set of packets for broadcast to a set of UEs, transmitting, to the set of UEs, a set of network encoded packets based on the set of packets, receiving feedback from each of one or more of the set of UEs, the feedback indicating, as respective subsets of the set of packets, successfully decoded packets of the set of packets at each of the one or more UEs, determining, from the feedback, an updated set of packets that excludes successfully decoded packets included in each of the subsets, transmitting an updated set of network encoded packets based on the updated set of packets to the set of UEs, and continuing to update and transmit the updated set of network encoded packets based on additional feedback received from the one or more of the set of UEs until the updated set of packets is empty.

An apparatus for wireless communication at a network node is described. The apparatus may include a processor, memory coupled with the processor, and instructions stored in the memory. The instructions may be executable by the processor to cause the apparatus to identify, at the network node, a set of packets for broadcast to a set of UEs, transmit, to the set of UEs, a set of network encoded packets based on the set of packets, receive feedback from each of one or more of the set of UEs, the feedback indicating, as respective subsets of the set of packets, successfully decoded packets of the set of packets at each of the one or more UEs, determine, from the feedback, an updated set of packets that excludes successfully decoded packets included in each of the subsets, transmit an updated set of network encoded packets based on the updated set of packets to the set of UEs, and continue to update and transmit the updated set of network encoded packets based on additional feedback received from the one or more of the set of UEs until the updated set of packets is empty.

Another apparatus for wireless communication at a network node is described. The apparatus may include means for identifying, at the network node, a set of packets for broadcast to a set of UEs, transmitting, to the set of UEs, a set of network encoded packets based on the set of packets, receiving feedback from each of one or more of the set of UEs, the feedback indicating, as respective subsets of the set of packets, successfully decoded packets of the set of packets at each of the one or more UEs, determining, from the feedback, an updated set of packets that excludes successfully decoded packets included in each of the subsets, transmitting an updated set of network encoded packets based on the updated set of packets to the set of UEs, and continuing to update and transmit the updated set of network encoded packets based on additional feedback received from the one or more of the set of UEs until the updated set of packets is empty.

A non-transitory computer-readable medium storing code for wireless communication at a network node is described. The code may include instructions executable by a processor to identify, at the network node, a set of packets for broadcast to a set of UEs, transmit, to the set of UEs, a set of network encoded packets based on the set of packets, receive feedback from each of one or more of the set of UEs, the feedback indicating, as respective subsets of the set of packets, successfully decoded packets of the set of packets at each of the one or more UEs, determine, from the feedback, an updated set of packets that excludes successfully decoded packets included in each of the subsets, transmit an updated set of network encoded packets based on the updated set of packets to the set of UEs, and continue to update and transmit the updated set of network encoded packets based on additional feedback received from the one or more of the set of UEs until the updated set of packets is empty.

In some examples of the method, apparatuses, and non-transitory computer-readable medium described herein, determining the updated set of packets may include operations, features, means, or instructions for determining an intersection of each of the subsets to identify the successfully decoded packets included in each of the subsets.

In some examples of the method, apparatuses, and non-transitory computer-readable medium described herein, receiving the feedback may include operations, features, means, or instructions for receiving the feedback via a packet data convergence protocol (PDCP) status report, a radio link control (RLC) status report, or a HARQ message.

In some examples of the method, apparatuses, and non-transitory computer-readable medium described herein, receiving the feedback may include operations, features, means, or instructions for receiving the feedback or the additional feedback in a network coding sub-layer, where the feedback indicates a decoding status of each packet of the set of packets.

Some examples of the method, apparatuses, and non-transitory computer-readable medium described herein may further include operations, features, means, or instructions for receiving a channel state information message in conjunction with the feedback or the additional feedback, and determining one or more encoding metrics for transmission of the updated set of packets based on the channel state information message.

In some examples of the method, apparatuses, and non-transitory computer-readable medium described herein, determining the one or more encoding metrics may include operations, features, means, or instructions for determining a modulation and coding scheme, an encoding rate, or a combination thereof.

In some examples of the method, apparatuses, and non-transitory computer-readable medium described herein, receiving the channel state information message may include operations, features, means, or instructions for receiving the channel state information message based on the feedback indicating a negative acknowledgement for one or more of the set of packets.

Some examples of the method, apparatuses, and non-transitory computer-readable medium described herein may further include operations, features, means, or instructions for transmitting, to one or more of the set of UEs, an indication of one or more network coding parameters, where at least the updated set of network encoded packets may be transmitted to the set of UEs in accordance with the one or more network coding parameters.

In some examples of the method, apparatuses, and non-transitory computer-readable medium described herein, transmitting the indication of the one or more network coding parameters may include operations, features, means, or instructions for transmitting an indication of a network coding algorithm, a network encoding function, a network encoding matrix, a number of decoding iterations, or a combination thereof.

In some examples of the method, apparatuses, and non-transitory computer-readable medium described herein, transmitting the indication of the one or more network coding parameters may include operations, features, means, or instructions for transmitting the one or more network coding parameters using medium access control-control element (MAC-CE) signaling or downlink control information signaling.

In some examples of the method, apparatuses, and non-transitory computer-readable medium described herein, transmitting the indication of the one or more network coding parameters may include operations, features, means, or instructions for transmitting the one or more network coding parameters using radio resource control signaling.

In some examples of the method, apparatuses, and non-transitory computer-readable medium described herein, transmitting the indication of the one or more network coding parameters may include operations, features, means, or instructions for transmitting an update to the one or more network coding parameters using radio resource control signaling.

In some examples of the method, apparatuses, and non-transitory computer-readable medium described herein, transmitting the indication of the one or more network coding parameters may include operations, features, means, or instructions for transmitting an indication to switch from one or more prior network coding parameters to the one or more network coding parameters.

Some examples of the method, apparatuses, and non-transitory computer-readable medium described herein may further include operations, features, means, or instructions for receiving, from the one or more of the set of UEs, a request for the one or more network coding parameters, where the indication of the one or more network coding parameters may be transmitted based on receiving the request.

In some examples of the method, apparatuses, and non-transitory computer-readable medium described herein, receiving the request may include operations, features, means, or instructions for receiving, the request using medium access control-control element (MAC-CE) signaling or uplink control information signaling.

In some examples of the method, apparatuses, and non-transitory computer-readable medium described herein, identifying the set of packets may include operations, features, means, or instructions for identifying the set of packets from a packet pool scheduled for broadcast to the set of UEs.

Some examples of the method, apparatuses, and non-transitory computer-readable medium described herein may further include operations, features, means, or instructions for identifying one or more additional packets for broadcast to the set of UEs based on the one or more additional packets being added to the packet pool.

Some examples of the method, apparatuses, and non-transitory computer-readable medium described herein may further include operations, features, means, or instructions for encoding the set of packets using an encoding function for transmission to the set of UEs, and encoding the updated set of packets using the encoding function for transmission to the set of UEs.

In some examples of the method, apparatuses, and non-transitory computer-readable medium described herein, the encoding function includes a matrix and each row of the matrix indicates a combination of packets.

A method of wireless communication is described. The method may include identifying, at the network node, a set of packets for broadcast to a set of UEs, transmitting, to the set of UEs, a set of network encoded packets based on the set of packets, receiving feedback from each of one or more of the set of UEs, the feedback indicating, as respective subsets of the set of packets, successfully decoded packets of the set of packets at each of the one or more UEs, determining, from the feedback, a second set of packets that is the set of packets excluding any successfully decoded packets included in any of the subsets, transmitting a second set of network encoded packets based on the second set of packets to the set of UEs, and continuing to update the determination and to transmit the second set of network encoded packets based on additional feedback received from the one or more of the set of UEs until the second set of packets is empty.

An apparatus for wireless communication is described. The apparatus may include a processor, memory coupled with the processor, and instructions stored in the memory. The instructions may be executable by the processor to cause the apparatus to identify, at the network node, a set of packets for broadcast to a set of UEs, transmit, to the set of UEs, a set of network encoded packets based on the set of packets, receive feedback from each of one or more of the set of UEs, the feedback indicating, as respective subsets of the set of packets, successfully decoded packets of the set of packets at each of the one or more UEs, determine, from the feedback, a second set of packets that is the set of packets excluding any successfully decoded packets included in any of the subsets, transmit a second set of network encoded packets based on the second set of packets to the set of UEs, and continue to update the determination and to transmit the second set of network encoded packets based on additional feedback received from the one or more of the set of UEs until the second set of packets is empty.

Another apparatus for wireless communication is described. The apparatus may include means for identifying, at the network node, a set of packets for broadcast to a set of UEs, transmitting, to the set of UEs, a set of network encoded packets based on the set of packets, receiving feedback from each of one or more of the set of UEs, the feedback indicating, as respective subsets of the set of packets, successfully decoded packets of the set of packets at each of the one or more UEs, determining, from the feedback, a second set of packets that is the set of packets excluding any successfully decoded packets included in any of the subsets, transmitting a second set of network encoded packets based on the second set of packets to the set of UEs, and continuing to update the determination and to transmit the second set of network encoded packets based on additional feedback received from the one or more of the set of UEs until the second set of packets is empty.

A non-transitory computer-readable medium storing code for wireless communication is described. The code may include instructions executable by a processor to identify, at the network node, a set of packets for broadcast to a set of UEs, transmit, to the set of UEs, a set of network encoded packets based on the set of packets, receive feedback from each of one or more of the set of UEs, the feedback indicating, as respective subsets of the set of packets, successfully decoded packets of the set of packets at each of the one or more UEs, determine, from the feedback, a second set of packets that is the set of packets excluding any successfully decoded packets included in any of the subsets, transmit a second set of network encoded packets based on the second set of packets to the set of UEs, and continue to update the determination and to transmit the second set of network encoded packets based on additional feedback received from the one or more of the set of UEs until the second set of packets is empty.

Some examples of the method, apparatuses, and non-transitory computer-readable medium described herein may further include operations, features, means, or instructions for determining, from the feedback and the additional feedback, an updated set of packets that excludes successfully decoded packets included in each of the subsets, and transmitting the updated set of packets to the set of UEs.

DETAILED DESCRIPTION

Figure 1:
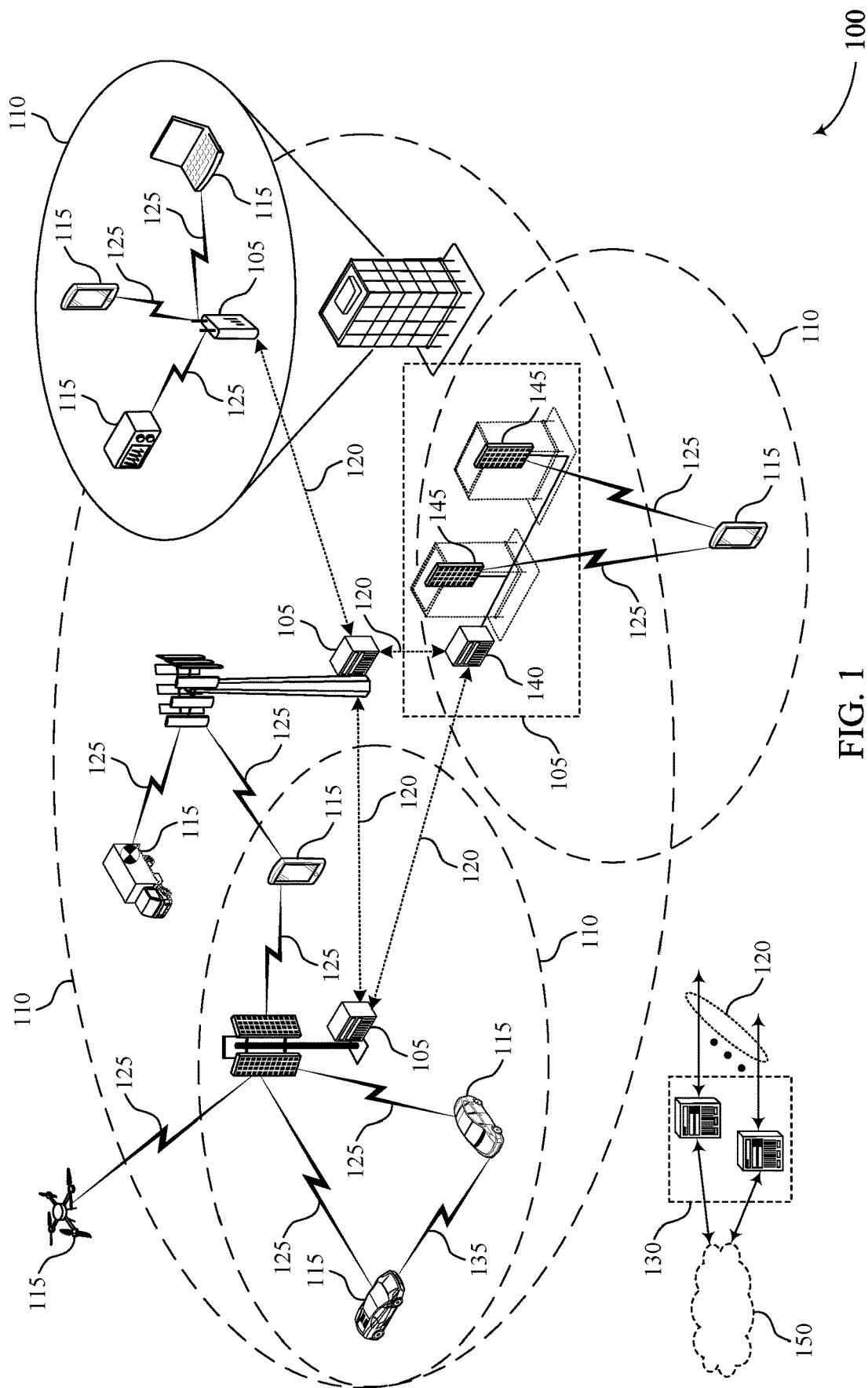
FIG. 1 illustrates an example of a system for wireless communications that supports broadcasting packets using network coding with feedback in accordance with aspects of the present disclosure.

Wireless communications systems may support broadcasting of network coded packets to a plurality of user equipments (UEs). The transmitter (e.g., a network node, base station, etc.) may broadcast multiple packets to multiple receivers (e.g., UEs). The broadcasting may be repeated blindly without the transmitters knowledge of network coded packets that have been decoded by the receivers. That is, if the broadcasting system does not utilize feedback associated with packets, the transmitter may continue to transmit packets blindly without any indication of packets that have actually been decoded by the UEs. Thus, the transmitter may rebroadcast packets in a wasteful manner, since some packets may have been decoded by all UEs. Thus, the lack of feedback may result in waste, unnecessary duplication of packets, and low efficiency.

Techniques described herein leverage feedback for broadcasted packets to determine which packets of a set to retransmit. The transmitter may identify a set of packets for broadcast to a plurality of UEs, transmit a set of network encoded packets based on the set of packets and use feedback associated with the transmitted packets to identify an updated set to transmit. The feedback may indicate the packets that each respective UE was able to successfully decode. In one design, the transmitter may update the set of packets by subtracting commonly decoded packets (e.g., an intersection of subsets) from the set of packets. In another design, the transmitter may update the set of packets by subtracting any successfully decoded packets (e.g., a union of the subsets) included in any subset indicated by the UEs in the feedback. The updated set of packets is then broadcast to the UEs. The updating and transmitting is performed until the feedback indicates that all of the UEs have decoded all of the packets. In some cases, the updating and transmitting is performed until the feedback indicates the updated set is empty. The transmitter may then transmit an updated set that excludes successfully decoded packets included in each of the subsets (e.g., an intersection) and from the original set and transmit the updated set.

The feedback may be received via one or more hybrid automatic repeat request (HARQ) messages, using a packet data convergence protocol (PDCP) status report, or a radio link control (RLC) status report. Further, the transmitter may configure the UEs with network encoding parameters, such as a network coding algorithm, a network coding function, a network encoding matrix, a number of decoding iterations, or a combination thereof. Thus, the transmitter and the UEs may be synchronized such that the transmitter may encode the packets and the UEs may decode the packets. In some examples, the transmitter may adjust encoding metrics, such as a modulation and coding scheme (MCS) or encoding rate, based on the feedback such that the UEs may have a higher probability of successfully decoding packets. These and other implementations are further described with respect to the figures.

Particular aspects of the subject matter described herein may be implemented to realize one or more advantages. The described techniques may support improvements in the packet broadcasting framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communication system and process flow diagrams. Aspects of the disclosure are further illustrated by and described with reference to apparatus diagrams, system diagrams, and flowcharts that relate to broadcasting packets using network coding with feedback.

FIG. 1 illustrates an example of a wireless communications system 100 that supports broadcasting packets using network coding with feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems 100 may support broadcasting packets to a plurality of UEs 115. The packets may be broadcast by a network node, which may be an example of a base station 105, UE 115, or the like. The transmitter may broadcast multiple packets to multiple receivers (e.g., UEs 115). The broadcasting may be repeated blindly without the transmitters knowledge of packets that have been decoded by the receivers. That is, if the broadcasting system does not utilize feedback associated with packets, the transmitter may continue to transmit packets blindly without any indication of packets that have actually been decoded by the UEs 115. Thus, the transmitter may rebroadcast packets in a wasteful manner, since some packets may have been decoded by all UEs. Thus, the lack of feedback may result in waste, unnecessary duplication of packets, and low efficiency.

Techniques described herein support a packet broadcasting design that uses feedback received from the UEs 115. The transmitter (e.g., base station 105) may identify a set of packets for broadcasting to a plurality of UEs 115 and transmit a set of network encoded packets based on the set of packets. Each of the receiving UEs 115 may provide feedback associated with decoding of the broadcasted packets. For example, feedback received from a particular UE 115 may indicate a subset of successfully decoded packets of the set of packets. The transmitter may determine an updated set of packets based on the feedback received from one or more of the UEs 115. The updated set of packets may be determined based on the set of packets minus the successfully decoded packets included in each of the subsets (e.g., an intersection of the subsets). In some cases, the updated set of packets may be determined based on the set of packets minus the any successfully decoded packets included in any of the subsets (e.g., a union of the subsets). The transmitter may transmit an updated set of network encoded packets based on the updated set and continue to update and transmit the packets based on feedback until the updated set of packets is empty. In some examples, the transmitter may then determine an updated set of packets based on the original set by subtracting an intersection of the subsets indicated by the feedback and transmit the updated set.

Using this technique, the transmitter may reduce waste and duplication of packets by retransmitting packets that have not been decoded by the UEs 115. This may result in increased efficiencies in the wireless communications system 100, and more particularly, a broadcasting system.

Different types of feedback may support these techniques. For example, the transmitter (e.g., base station 105) may use HARQ messages received from the UEs 115 to update the sets of packets. The HARQ message may indicate an acknowledgement (ACK) or negative-acknowledgement (NACK) for one or more packets. Thus, based on the ACKs and NAKs, the transmitter may determine which packets were successfully decoded by which UEs 115. In some examples, the feedback is received via one or more PDCP status reports, one or more RLC status reports, or the like. Further to support these techniques, the transmitter may configure the UEs 115 with network coding parameters, which the UEs 115 may use to decode the packets. The transmitter may update the various encoding metrics during the broadcasting to increase the likelihood that the UEs 115 are able to decode the packets. For example, the transmitter may receive a channel state information (CSI) report based on receiving a NACK for one or more packets and update the modulation and coding scheme or encoding rate based on the CSI report.

Figure 2:
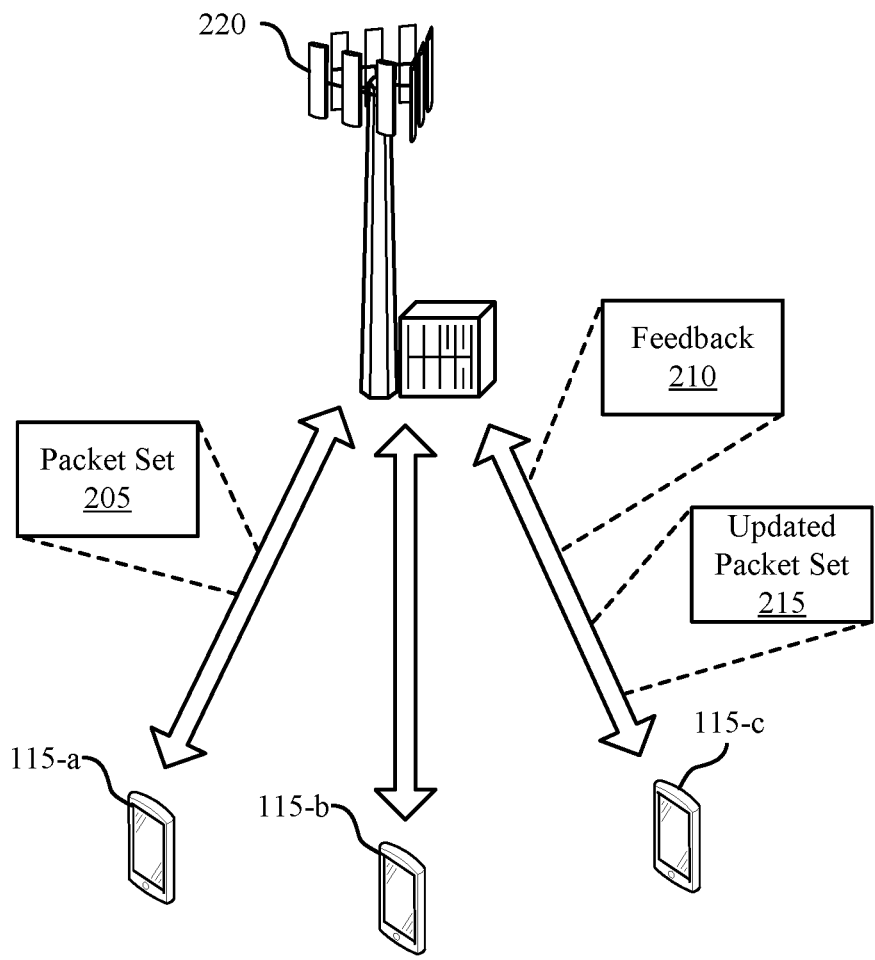
FIG. 2 illustrates an example of a wireless communications system that supports broadcasting packets using network coding with feedback in accordance with aspects of the present disclosure.

FIG. 2 illustrates an example of a wireless communications system 200 that supports broadcasting packets using network coding with feedback in accordance with aspects of the present disclosure. In some examples, wireless communications system 200 may implement aspects of wireless communication system 100. The wireless communications system 200 includes a network entity 220 and UEs 115-*a*, 115-*b*, and 115-*c*, which may be an example of the corresponding devices of FIG. 1. The wireless communications system 200 illustrates an example of a packet broadcasting system. The network entity 220 may be an example of a base station 105 of FIG. 1, a network node, a transmitter, or the like.

The network entity 220 may configure the UEs 115-*c* with network coding parameters, such as an encoding matrix, encoding/decoding function, etc. These parameters may be used by the UEs 115-*c* to decode the packets. For example, a row of the encoding matrix may indicate an ordering or grouping of network encoded packets that are transmitted to the UEs 115. The network coding parameters may be signaling using medium access control-control element (MAC-CE) signaling, downlink control information (DCI), or RRC signaling. In some cases, multiple sets of network coding parameters may be signaled.

The network entity 220 may identify a set of packets for transmission to the plurality of UEs 115. In one example, the network entity 220 identifies the set of packets from a packet pool, which may be a set of packets scheduled for broadcasting. In some examples, the broadcasting may support a content streaming service and the packets may correspond to the streamed content. From the set of packets, the network entity 220 may encode (e.g., using the indicated encoding function and matrix) and transmit a set of network encoded packets 205 to the plurality of UEs 115-*a* in a broadcast manner. Each of the UEs 115 may receive and attempt to decode the set of network encoded packets 205. The UEs 115-*a* may transmit feedback 210 to the network entity 220, and the feedback 210 may indicate a subset of the set of network encoded packets that the respective UE 115-*a* was able to successfully decode. For example, UE 115-*a* may transmit feedback 210 that indicates a first subset of the set of packets 205 that the UE 115-a was able to successfully decode, while UE 115-b transmits feedback 210 that indicates a second subset of the set of packets that the UE 115-b was able to successfully decode.

Based on the received feedback 210, the network entity 220 may update the set of packets and transmit an updated set of network encoded packets 215. The set of packets may be updated by subtracting commonly decoded packets by the UEs 115 from the set of packets. A packet is commonly decoded if it is included each indicated feedback 210. The commonly decoded packets may be determined by determining an intersection of all subsets of decoded packets indicated in the feedbacks 210. In some examples, the set of packets may be updated by subtracting any successfully decoded packets included in any of the subsets (e.g., a union of the subsets). This updated set may represent the commonly needed packets. The updated set of network encoded packets 215 is transmitted to the UE and the network entity 220 may continue to update and transmit the updated set of network encoded packets 215 based on additional feedback 210 until the updated set of packets is empty. That is, the network entity 220 may stop updating and transmitting when the feedback 210 indicates that each UE 115 has decoded each packet of the set of packets (e.g., the packet pool). When the network entity 220 updates the set of packets by subtracting any successfully decoded packets included in any of the subsets (e.g., a union of the subsets), the network entity 220 may stop updating and transmitting when the feedback 210 indicates that each UE 115 has decoded each packet of the set of packets (e.g., the packet pool). Thereafter, the network entity 220 may update the original se by subtracting an intersection of decoded packets by the UEs 115 (e.g., commonly decoded packets) from the original set. This process may be repeated until feedback indicates that the UEs 115 have decoded each packet of the set.

As noted herein, the feedback 210 may be an example of one or HARQ messages. In other cases, the feedback 210 may be an example of a PDCP status report or RLC status report. Based on the reports or HARQ messages, the network entity 220 may infer the packet decoding/recovery results. In some examples, the UEs 115 may transmit the feedback 210 in the network coding sub-layer, and such feedback 210 may directly indicate the decoding success/failure corresponding to each packet. Thus, rather than inferring packet decoding success failure based on HARQ messages (e.g., correlating HARQ messages to packets), the feedback 210 may directly indicate packet decoding success or failure. In some cases, one or more of the UEs 115 transmit a CSI report to facilitate MCS selection or rate control. Thus, based on received feedback 210 and a CSI report, the network entity 220 may adjust the MCS or encoding rate to increase likelihood of successful decoding by the UEs 115. In some examples, the CSI report is transmitted when a NACK is transmitted in order to request the updated MCS or data encoding rate for better data reception.

As noted herein, one or more sets of network coding parameters may be configured at the UEs 115. If one set of parameters is configured at one or more of the UEs 115 and the network entity 220 determines that the transmission is underperforming (e.g., that the feedback 210 indicates that a relatively high number of packets are going undecoded), then the network entity 220 may transmit a new set of network coding parameters to the UEs 115 (e.g., via MAC-CE or DCI). In other cases, the UE 115 may request an updated set of network coding parameters (e.g., via MAC-CE or uplink control information (UCI)). In either case, after the updated set of parameters is transmitted, subsequent sets of packets may be encoded and transmitted according to the updated set of parameters. If multiple sets of network coding parameters are synchronized between the network entity 220 and the UEs 115, then the network entity 220 may transmit an instruction to switch between sets of parameters (e.g., based on underperformance or based on a request from a UE 115 received via MAC-CE or UCI) via MAC-CE or DCI.

In some examples, the encoding function may utilize an encoding matrix. The same encoding function may be used in each transmission, and the transmitted set of packets may change. The encoding matrix may be a random matrix that is configured at the network entity 220 and the UEs 115. An example encoding matrix is as follows:

$$G = \begin{matrix} 1 & 1 & 0 \\ 0 & 1 & 0 \\ 1 & 0 & 1 \end{matrix},$$

where each row denotes the random combination of packets and different row is used at different transmission instance. In the above example, each transmission instance, p, may be configured as follows p1=s1+s2, p2=s2, p3=s1+s3.

Figure 3:
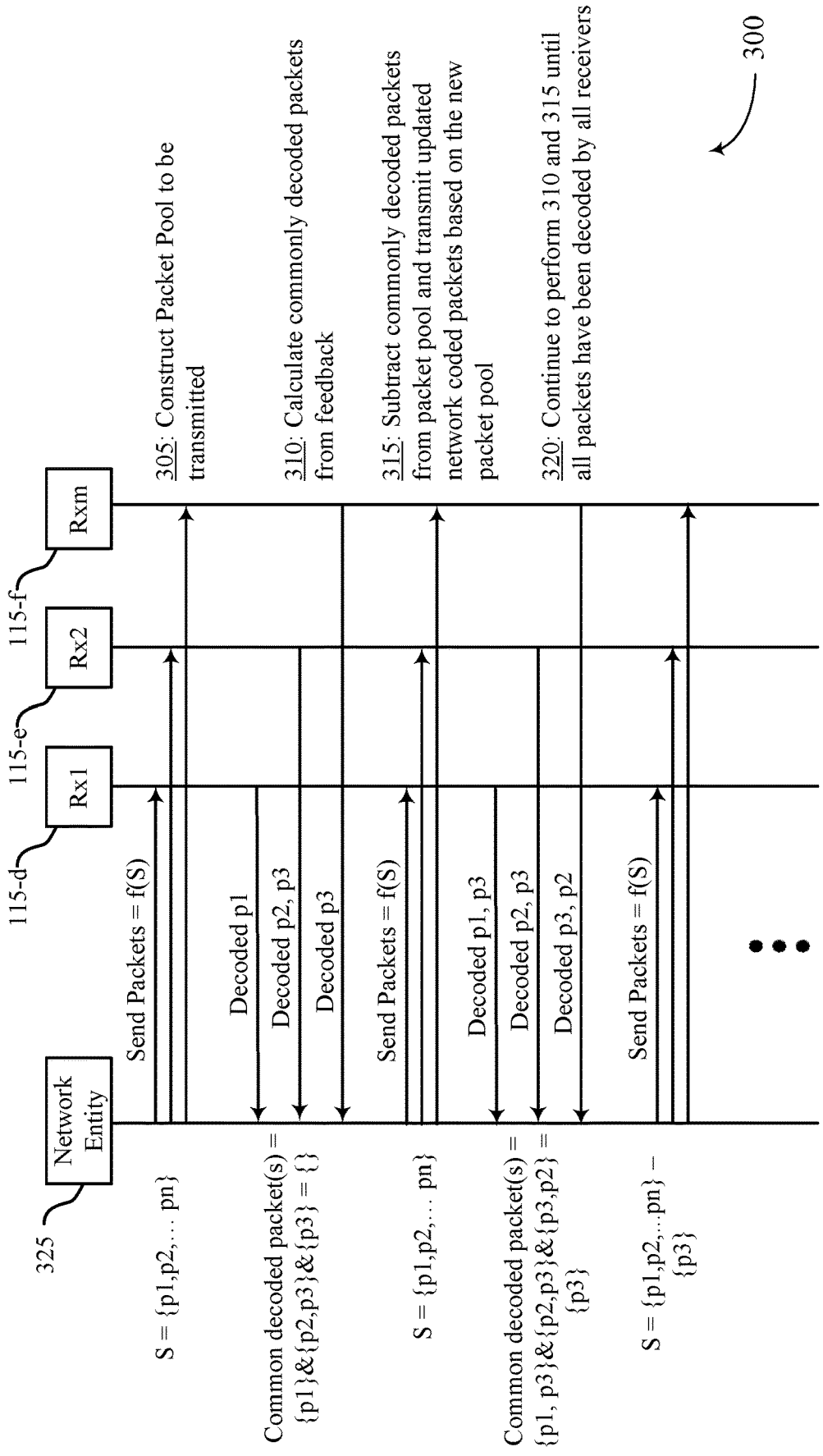
FIG. 3 illustrates an example of a process flow diagram that supports broadcasting packets using network coding with feedback in accordance with aspects of the present disclosure.

FIG. 3 illustrates an example of a process flow diagram 300 that supports broadcasting packets using network coding with feedback in accordance with aspects of the present disclosure. In some examples, process flow diagram 300 may implement aspects of wireless communication system 100. The process flow diagram 300 includes network entity 305 and UEs 115, which may be examples of the corresponding devices of FIGS. 1 and 2.

At 305, the network entity 325 may construct a packet pool S={p1, p2 ... pn}. The set of network encoded packets may be encoded using an encoding function f(S) and the set of network encoded packets may be transmitted to the UEs 115. Each UE 115 may transmit feedback that indicates packets of the set that were successfully decoded. For example, UE 115-d successfully decodes packet p1, UE 115-e successfully decodes packets p2 and p3, and UE 115-f successfully decodes packet p3. At 310, the network entity 325 calculates commonly decoded packets based on the feedback. In some cases, commonly decoded packets are determined using an intersection of subsets of decoded packets: {p1} & {p2, p3} & {p3}={ }. In this example, there are no commonly decoded packets, so the network entity 325 encodes and transmits the set of packets S. More particularly, the network entity 325 does not update the packet pool or set of packets S, so the network entity 325 keeps transmitting the new network encoded packets based on the packet pool S.

The UEs 115 transmit feedback and the network entity calculates the commonly decoded packets again at 310: {p1, p3} & {p2, p3} & {p3, p2}={p3} (e.g., p3 is a commonly decoded packet). At 315, the network entity 325 subtracts the commonly decoded packets from the packet set to update the packet set and transmits the updated packet set (encoded with (f)) to the UEs 115. At 320, the network entity continues to perform 310 and 315 until the packets have been decoded by the UEs 115. In some cases, a packet may be added to the packet pool during broadcasting. In such cases, the packet set is updated to include the additional packets.

Figure 4:
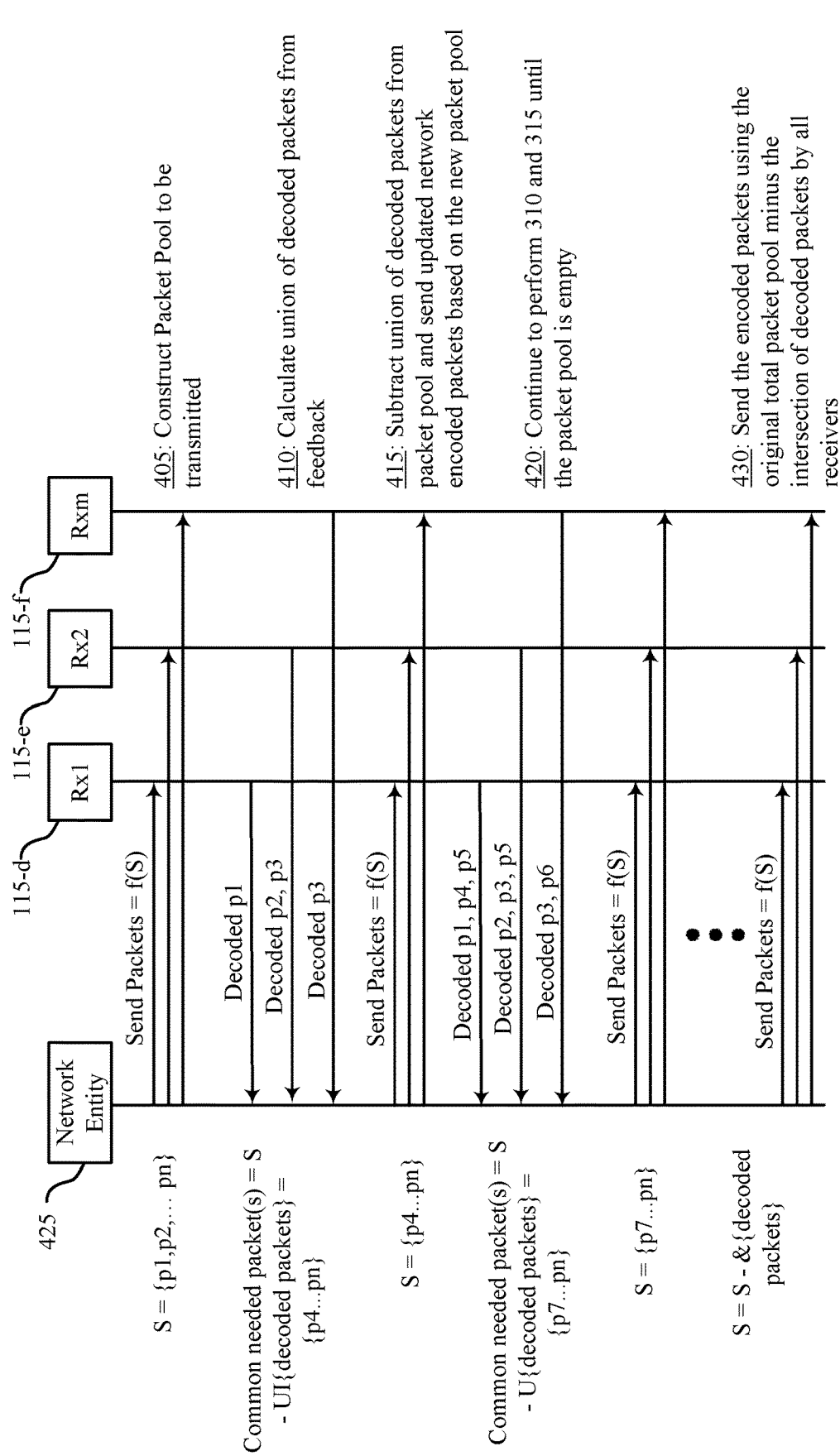
FIG. 4 illustrates an example of a process flow diagram that supports broadcasting packets using network coding with feedback in accordance with aspects of the present disclosure.

FIG. 4 illustrates an example of a process flow diagram 400 that supports broadcasting packets using network coding with feedback in accordance with aspects of the present disclosure. In some examples, process flow diagram 400 may implement aspects of wireless communication system 100. The process flow diagram 400 includes network entity 405 and UEs 115, which may be examples of the corresponding devices of FIGS. 1 and 2.

At 405, the network entity 425 may construct a packet pool S={p1, p2 ... pn}. The set of network encoded packets may be encoded using an encoding function f(S) and the set of network encoded packets may be transmitted to the UEs 115. Each UE 115 may transmit feedback that indicates packets of the set that were successfully decoded. For example, UE 115-*d* successfully decodes packet p1, UE 115-*e* successfully decodes packets p2 and p3, and UE 115-*f* successfully decodes packet p3. At 410, the network entity 425 calculates a union of decoded packets based on the feedback. At 415, the network entity 425 subtracts the union of the decoded packets from the packet pool and transmits the updated network encoded packets (e.g., encoded using encoding function, f( )) to the UEs 115. The updated set represents the commonly needed packets (e.g., undecoded by each UE 115). At 420, the network entity 425 continues to perform 410 and 415 until the packet pool is empty. In some cases, a packet may be added to the packet pool during broadcasting. In such cases, the packet set is updated to include the additional packets. When the packet pool is empty, at 430 the network entity 425 may send network encoded packets (encoded using encoding function f( )) based on the original set of packets, S, minus the intersection of decoded packets by all receivers (e.g., commonly decoded packets). This process may be repeated until the feedback indicates that the packets are successfully decoded by the UEs 115.

Figure 5:
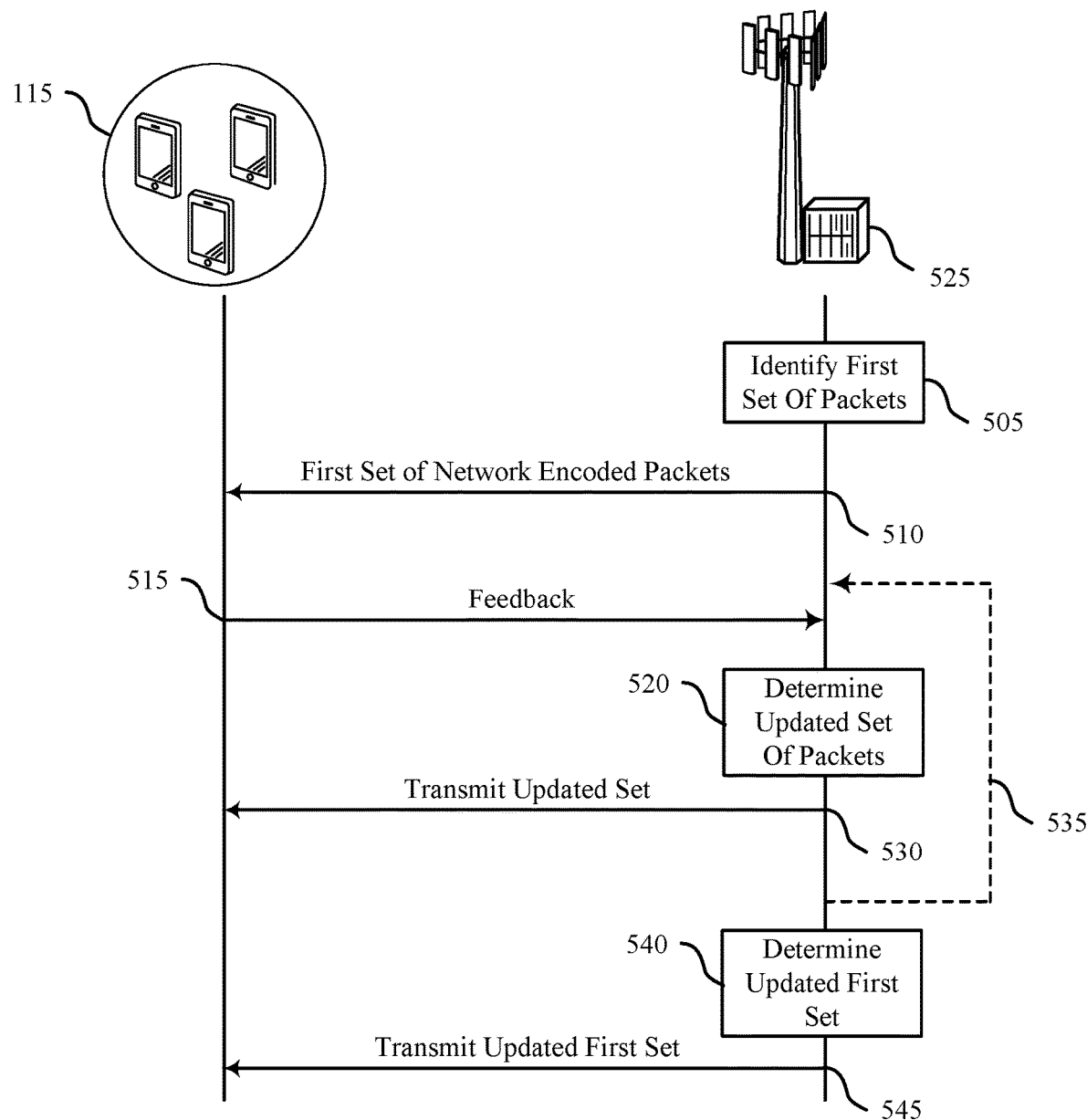
FIG. 5 illustrates an example of a process flow diagram that supports broadcasting packets using network coding with feedback in accordance with aspects of the present disclosure.

FIG. 5 illustrates an example of a process flow diagram 500 that supports broadcasting packets using network coding with feedback in accordance with aspects of the present disclosure. In some examples, process flow diagram 500 may implement aspects of wireless communication system 100. The process flow diagram 500 includes a plurality of UEs 115 and a network node 525. The plurality of UEs 115 may be examples of the corresponding devices as described with respect to FIGS. 1 through 3, and the network node 525 may be an example of a base station 105 as describe with respect to FIG. 1 or a network entity 220 or 325 as described with respect to FIGS. 2 and 3.

At 505, the network node 525 may identify a set of packets for broadcast to the plurality of UEs 115. The set of packets may be identified from a packet pool that includes packets scheduled for transmission. At 510, the network node 525 transmits, to the plurality of UEs 115, a set of network encoded packets based on the set of packets. That is, the network node 525 may encode the set of packets using an encoding function and transmit the packets to the UEs 115.

At 515, the network node 525 may receive feedback from each of one or more of the plurality of UEs 115, the feedback indicating, as respective subsets of the set of packets, successfully decoded packets of the set of packets at each of the one or more UEs 115. The feedback may be received via HARQ signaling, via network coding sub-layer, a PDCP status report, or an RLC status report. In some cases, CSI may be received in conjunction with the feedback.

At 520, the network node 525 may determine, from the feedback, an updated set of packets. In some cases, the updated set of packets may exclude successfully decoded packets included in each of the subsets. In some cases, the commonly decoded packets may be determined using an intersection function. Alternatively, or additionally, the updated set of packets may be the first set of packets excluding any successfully decoded packets included in any of the subsets. In some cases, determining the second subset may exclude the union of each of the subsets.

At 530, the network node 525 may transmit an updated set of network encoded packets based on the updated set of packets to the plurality of UEs 115. The updated set of packets may be encoded using the encoding function.

At 535, the network node 525 may continue to update and transmit the updated set of network encoded packets based on additional feedback received from the one or more of the plurality of UEs until the updated set of packets is empty.

At 540, the network node 525 may determine, from the feedback and the additional feedback, an updated first set of packets that excludes successfully decoded packets included in each of the subsets. At 545, the network node 525 may transmit the updated first set of packets to the plurality of UEs 115.

Figure 6:
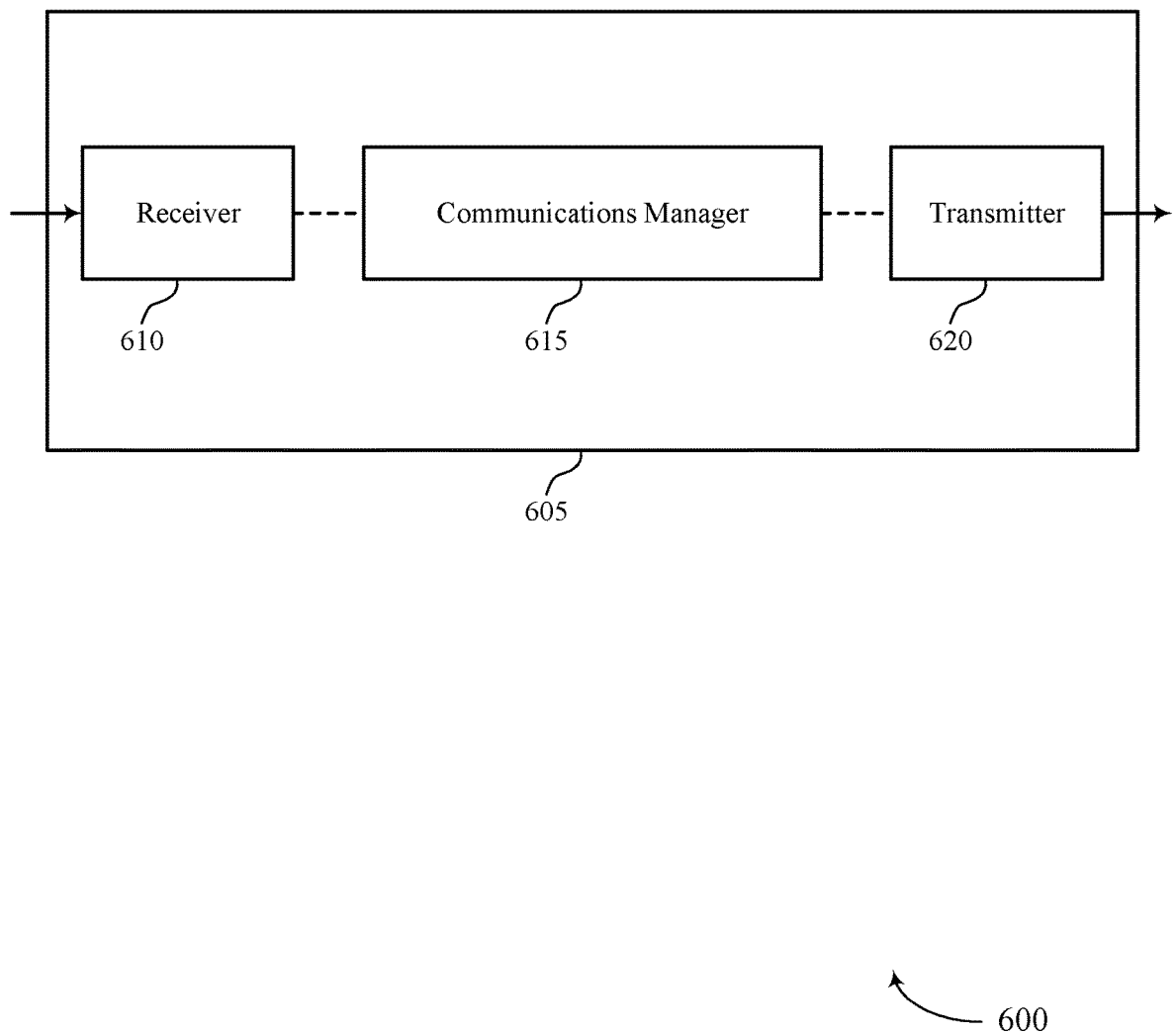
FIGS. 6 and 7 show block diagrams of devices that support broadcasting packets using network coding with feedback in accordance with aspects of the present disclosure.

FIG. 6 shows a block diagram 600 of a device 605 that supports broadcasting packets using network coding with feedback in accordance with aspects of the present disclosure. The device 605 may be an example of aspects of a network entity as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to broadcasting packets using network coding with feedback, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify, at the network node, a set of packets for broadcast to a set of user equipments (UEs), transmit, to the set of UEs, a set of network encoded packets based on the set of packets, transmit an updated set of network encoded packets based on the updated set of packets to the set of UEs, receive feedback from each of one or more of the set of UEs, the feedback indicating, as respective subsets of the set of packets, successfully decoded packets of the set of packets at each of the one or more UEs, determine, from the feedback, an updated set of packets that excludes successfully decoded packets included in each of the subsets, and continue to update and transmit the updated set of network encoded packets based on additional feedback received from the one or more of the set of UEs until the updated set of packets is empty. The communications manager 615 may be an example of aspects of the communications manager 910 described herein.

The communications manager 615 may identify, at the network node, a first set of packets for broadcast to a set of user equipments (UEs), transmit, to the set of UEs, a first set of network encoded packets based on the first set of packets, transmit a second set of network encoded packets based on the second set of packets to the set of UEs, receive feedback from each of one or more of the set of UEs, the feedback indicating, as respective subsets of the first set of packets, successfully decoded packets of the first set of packets at each of the one or more UEs, determine, from the feedback, a second set of packets that is the first set of packets excluding any successfully decoded packets included in any of the subsets, and continue to update the determination and to transmit the second set of network encoded packets based on additional feedback received from the one or more of the set of UEs until the second set of packets is empty. The communications manager 615 may be an example of aspects of the communications manager 910 described herein.

Additionally, or alternatively, the communications manager 615 may identify, at the network node, a first set of packets for broadcast to a plurality of user equipments (UEs), transmit, to the plurality of UEs, a first set of network encoded packets based on the first set of packets, receive feedback from each of one or more of the plurality of UEs, the feedback indicating, as respective subsets of the first set of packets, successfully decoded packets of the first set of packets at each of the one or more UEs, determine, from the feedback, an updated set of packets, transmit an updated set of network encoded packets based on the updated set of packets to the plurality of UEs, and continue to update and transmit the updated set of network encoded packets based on additional feedback received from the one or more of the plurality of UEs until the updated set of packets is empty. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to more efficiently coordinate transmission of packets to a plurality of UEs. between a set of TRPs and the device 605, and more specifically to coordinate transmission of the packets based on feedback received from the UEs.

Based on implementing the packet broadcasting techniques as described herein, a processor of a UE 115 (e.g., controlling the receiver 610, the transmitter 620, or the transceiver 920 as described with reference to FIG. 9) may increase reliability and decrease signaling overhead due to the reduction of repeated transmission of packets.

Figure 7:
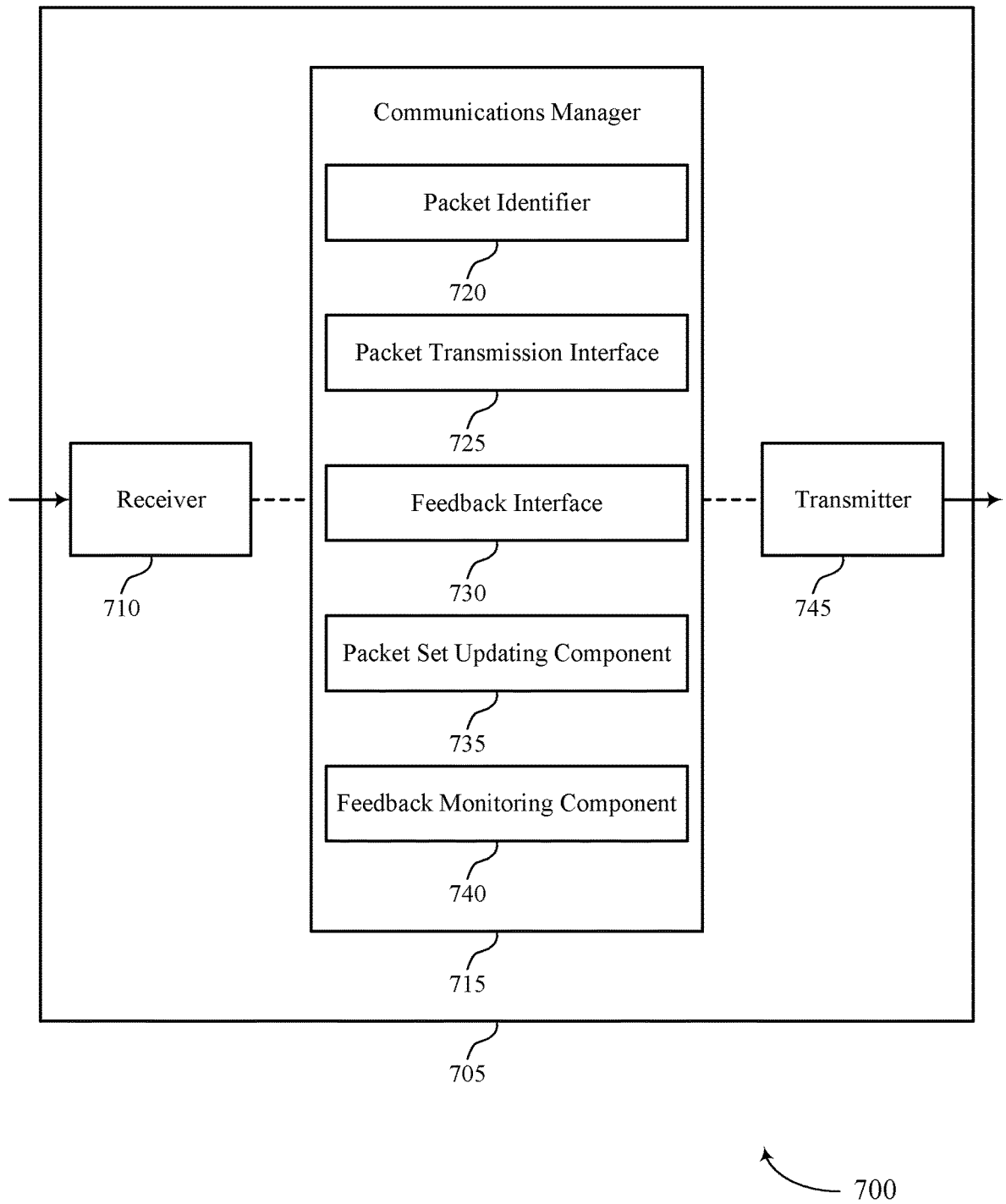

FIG. 7 shows a block diagram 700 of a device 705 that supports broadcasting packets using network coding with feedback in accordance with aspects of the present disclosure. The device 705 may be an example of aspects of a device 505, a UE 115, or a network entity or node as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to broadcasting packets using network coding with feedback, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 515 as described herein. The communications manager 715 may include a packet identifier 720, a packet transmission interface 725, a feedback interface 730, a packet set updating component 735, and a feedback monitoring component 740. The communications manager 715 may be an example of aspects of the communications manager 910 described herein.

The packet identifier 720 may identify, at the network node, a set of packets for broadcast to a set of user equipments (UEs).

The packet transmission interface 725 may transmit, to the set of UEs, a set of network encoded packets based on the set of packets and transmit an updated set of network encoded packets based on the updated set of packets to the set of UEs.

The feedback interface 730 may receive feedback from each of one or more of the set of UEs, the feedback indicating, as respective subsets of the set of packets, successfully decoded packets of the set of packets at each of the one or more UEs.

The packet set updating component 735 may determine, from the feedback, an updated set of packets. In some examples, the packet set updating component may determine an updated set of packets that excludes successfully decoded packets included in each of the subsets. In some examples, the packet set updating component may determine an updated set of packets that may be the first set of packets excluding any successfully decoded packets included in any of the subsets The feedback monitoring component 740 may continue to update and transmit the updated set of network encoded packets based on additional feedback received from the one or more of the set of UEs until the updated set of packets is empty.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
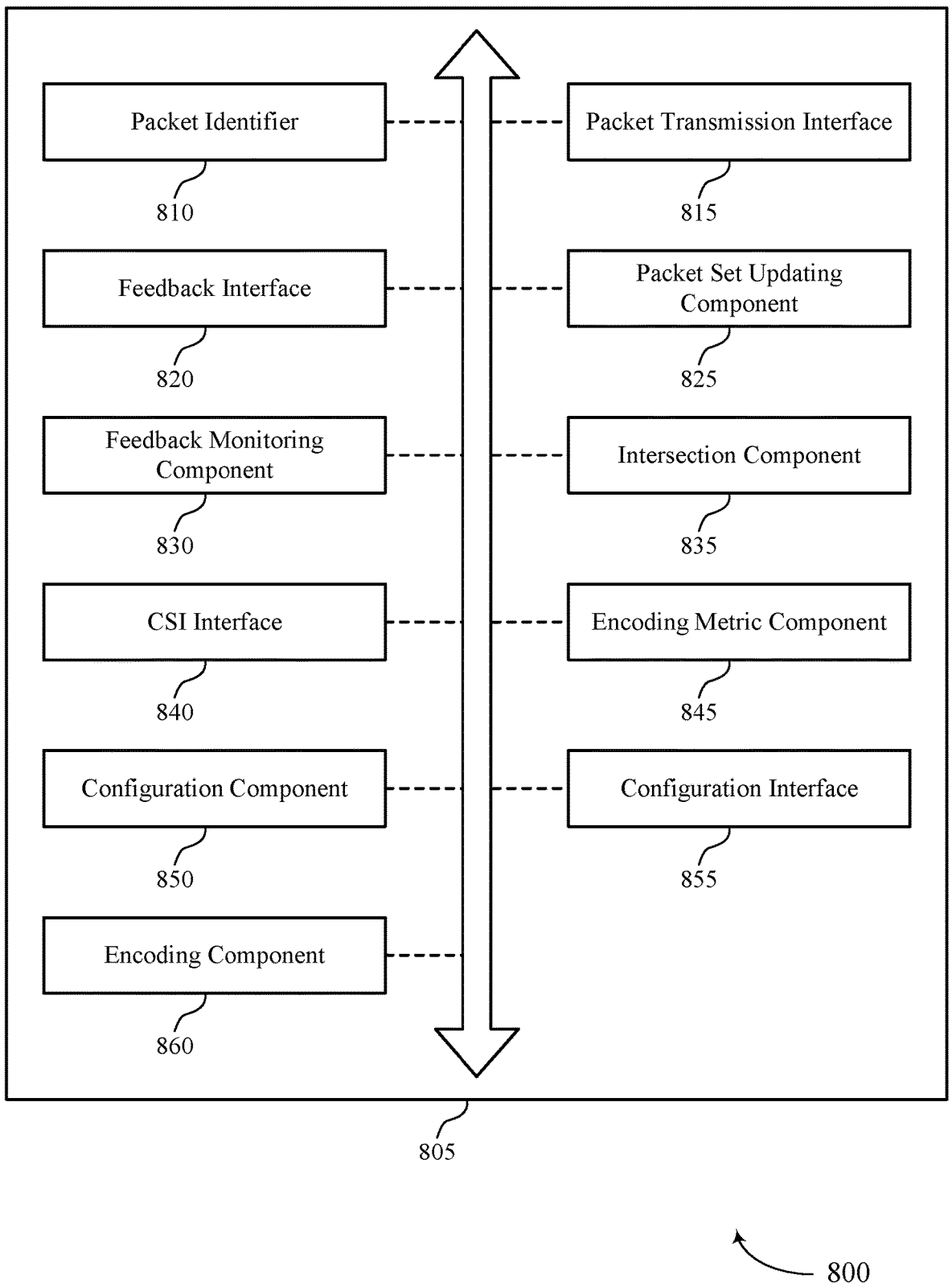
FIG. 8 shows a block diagram of a communications manager that supports broadcasting packets using network coding with feedback in accordance with aspects of the present disclosure.

FIG. 8 shows a block diagram 800 of a communications manager 805 that supports broadcasting packets using network coding with feedback in accordance with aspects of the present disclosure. The communications manager 805 may be an example of aspects of a communications manager 615, a communications manager 715, or a communications manager 910 described herein. The communications manager 805 may include a packet identifier 810, a packet transmission interface 815, a feedback interface 820, a packet set updating component 825, a feedback monitoring component 830, an intersection component 835, a CSI interface 840, an encoding metric component 845, a configuration component 850, a configuration interface 855, and an encoding component 860. Each of these modules may communicate, directly or indirectly, with one another (e.g., via one or more buses).

The packet identifier 810 may identify, at the network node, a set of packets for broadcast to a set of user equipments (UEs). In some examples, the packet identifier 810 may identify the set of packets from a packet pool scheduled for broadcast to the set of UEs.

In some examples, the packet identifier 810 may identify one or more additional packets for broadcast to the set of UEs based on the one or more additional packets being added to the packet pool.

The packet transmission interface 815 may transmit, to the set of UEs, a set of network encoded packets based on the set of packets.

In some examples, the packet transmission interface 815 may transmit an updated set of network encoded packets based on the updated set of packets to the set of UEs.

The feedback interface 820 may receive feedback from each of one or more of the set of UEs, the feedback indicating, as respective subsets of the set of packets, successfully decoded packets of the set of packets at each of the one or more UEs.

In some examples, the feedback interface 820 may receive the feedback via a packet data convergence protocol (PDCP) status report, an RLC status report, or a HARQ message.

In some examples, the feedback interface 820 may receive the feedback or the additional feedback in a network coding sub-layer, where the feedback indicates a decoding status of each packet of the set of packets.

The packet set updating component 825 may determine, from the feedback, an updated set of packets. In some examples, the packet set updating component 825 may determine an updated set of packets that excludes successfully decoded packets included in each of the subsets. In some examples, the packet set updating component 825 may determine an updated set of packets that may be the first set of packets excluding any successfully decoded packets included in any of the subsets The feedback monitoring component 830 may continue to update and transmit the updated set of network encoded packets based on additional feedback received from the one or more of the set of UEs until the updated set of packets is empty.

The packet set updating component 825 may determine from the feedback and the additional feedback, an updated first set of packets that excludes successfully decoded packets included in each of the subsets.

The intersection component 835 may determine an intersection of each of the subsets to identify the successfully decoded packets included in each of the subsets.

The CSI interface 840 may receive a channel state information message in conjunction with the feedback or the additional feedback.

In some examples, the CSI interface 840 may receive the channel state information message based on the feedback indicating a negative acknowledgement for one or more of the set of packets.

The encoding metric component 845 may determine one or more encoding metrics for transmission of the updated set of packets based on the channel state information message.

In some examples, the encoding metric component 845 may determine a modulation and coding scheme, an encoding rate, or a combination thereof.

The configuration component 850 may transmit, to one or more of the set of UEs, an indication of one or more network coding parameters, where at least the updated set of network encoded packets are transmitted to the set of UEs in accordance with the one or more network coding parameters.

In some examples, the configuration component 850 may transmit an indication of a network coding algorithm, a network encoding function, a network encoding matrix, a number of decoding iterations, or a combination thereof.

In some examples, the configuration component 850 may transmit the one or more network coding parameters using medium access control-control element (MAC-CE) signaling or downlink control information signaling.

In some examples, the configuration component 850 may transmit the one or more network coding parameters using radio resource control signaling.

In some examples, the configuration component 850 may transmit an update to the one or more network coding parameters using radio resource control signaling.

In some examples, the configuration component 850 may transmit an indication to switch from one or more prior network coding parameters to the one or more network coding parameters. In some examples, the configuration component 850 may receive, the request using medium access control-control element (MAC-CE) signaling or uplink control information signaling.

The configuration interface 855 may receive, from the one or more of the set of UEs, a request for the one or more network coding parameters, where the indication of the one or more network coding parameters is transmitted based on receiving the request. The encoding component 860 may encode the set of packets using an encoding function for transmission to the set of UEs.

In some examples, the encoding component 860 may encode the updated set of packets using the encoding function for transmission to the set of UEs. In some cases, the encoding function includes a matrix and each row of the matrix indicates a combination of packets.

Figure 9:
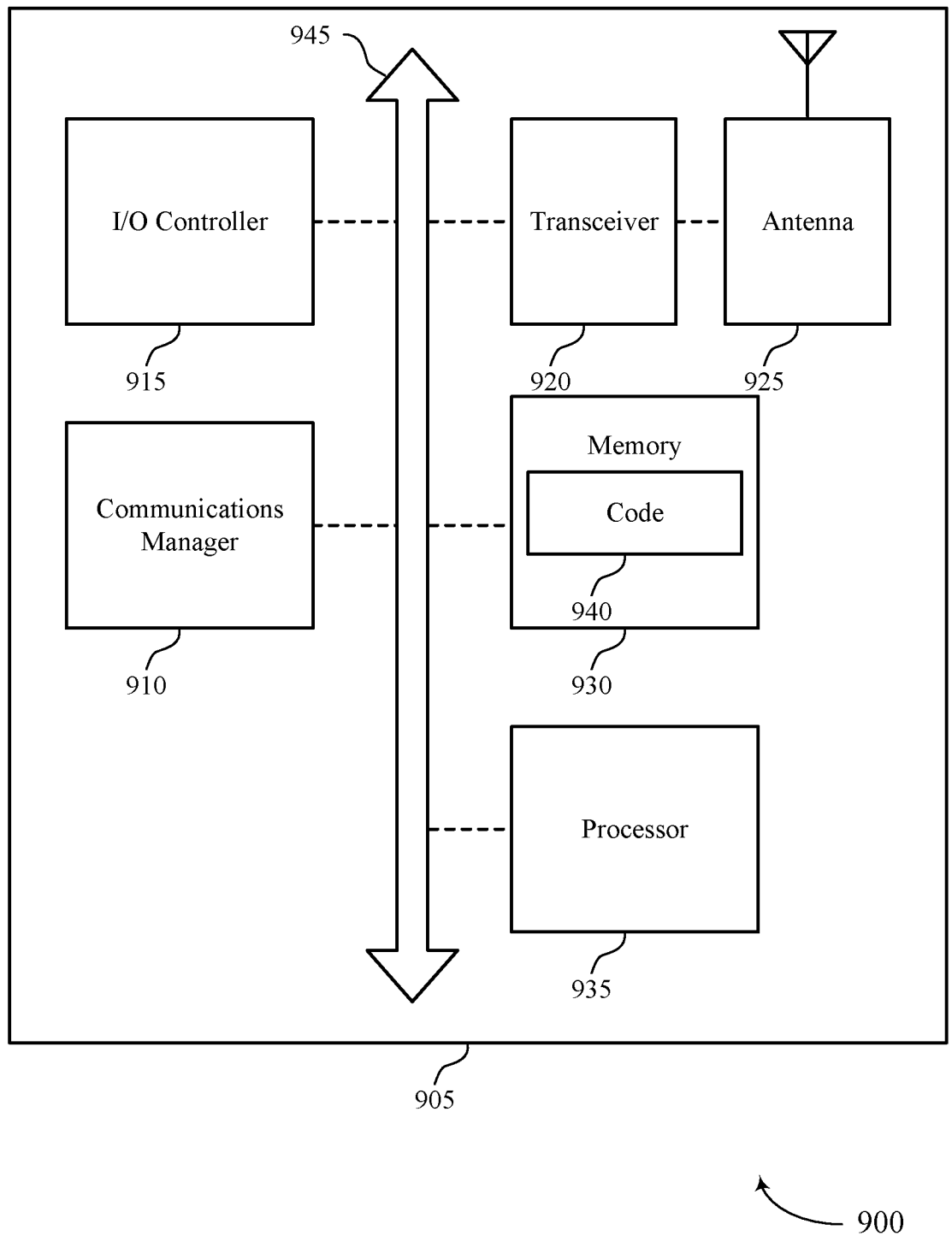
FIG. 9 shows a diagram of a system including a device that supports broadcasting packets using network coding with feedback in accordance with aspects of the present disclosure.

FIG. 9 shows a diagram of a system 900 including a device 905 that supports broadcasting packets using network coding with feedback in accordance with aspects of the present disclosure. The device 905 may be an example of or include the components of device 505, device 605, or a network entity as described herein. The device 905 may include components for bi-directional voice and data communications including components for transmitting and receiving communications, including a communications manager 910, an I/O controller 915, a transceiver 920, an antenna 925, memory 930, and a processor 935. These components may be in electronic communication via one or more buses (e.g., bus 945).

The communications manager 910 may identify, at the network node, a set of packets for broadcast to a set of user equipments (UEs), transmit, to the set of UEs, a set of network encoded packets based on the set of packets, transmit an updated set of network encoded packets based on the updated set of packets to the set of UEs, receive feedback from each of one or more of the set of UEs, the feedback indicating, as respective subsets of the set of packets, successfully decoded packets of the set of packets at each of the one or more UEs, determine, from the feedback, an updated set of packets that excludes successfully decoded packets included in each of the subsets, and continue to update and transmit the updated set of network encoded packets based on additional feedback received from the one or more of the set of UEs until the updated set of packets is empty.

Alternatively, or additionally, the communications manager 910 may identify, at the network node, a first set of packets for broadcast to a plurality of user equipments (UEs), transmit, to the plurality of UEs, a first set of network encoded packets based on the first set of packets, receive feedback from each of one or more of the plurality of UEs, the feedback indicating, as respective subsets of the first set of packets, successfully decoded packets of the first set of packets at each of the one or more UEs, determine, from the feedback, an updated set of packets, transmit an updated set of network encoded packets based on the updated set of packets to the plurality of UEs, and continue to update and transmit the updated set of network encoded packets based on additional feedback received from the one or more of the plurality of UEs until the updated set of packets is empty.

The communications manager 910 may identify, at the network node, a first set of packets for broadcast to a set of user equipments (UEs), transmit, to the set of UEs, a first set of network encoded packets based on the first set of packets, transmit a second set of network encoded packets based on the second set of packets to the set of UEs, receive feedback from each of one or more of the set of UEs, the feedback indicating, as respective subsets of the first set of packets, successfully decoded packets of the first set of packets at each of the one or more UEs, determine, from the feedback, a second set of packets that is the first set of packets excluding any successfully decoded packets included in any of the subsets, and continue to update the determination and to transmit the second set of network encoded packets based on additional feedback received from the one or more of the set of UEs until the second set of packets is empty.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 940 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 930) to cause the device 905 to perform various functions (e.g., functions or tasks supporting broadcasting packets using network coding with feedback).

The code 940 may include instructions to implement aspects of the present disclosure, including instructions to support wireless communications. The code 940 may be stored in a non-transitory computer-readable medium such as system memory or other type of memory. In some cases, the code 940 may not be directly executable by the processor 935 but may cause a computer (e.g., when compiled and executed) to perform functions described herein.

Figure 10:
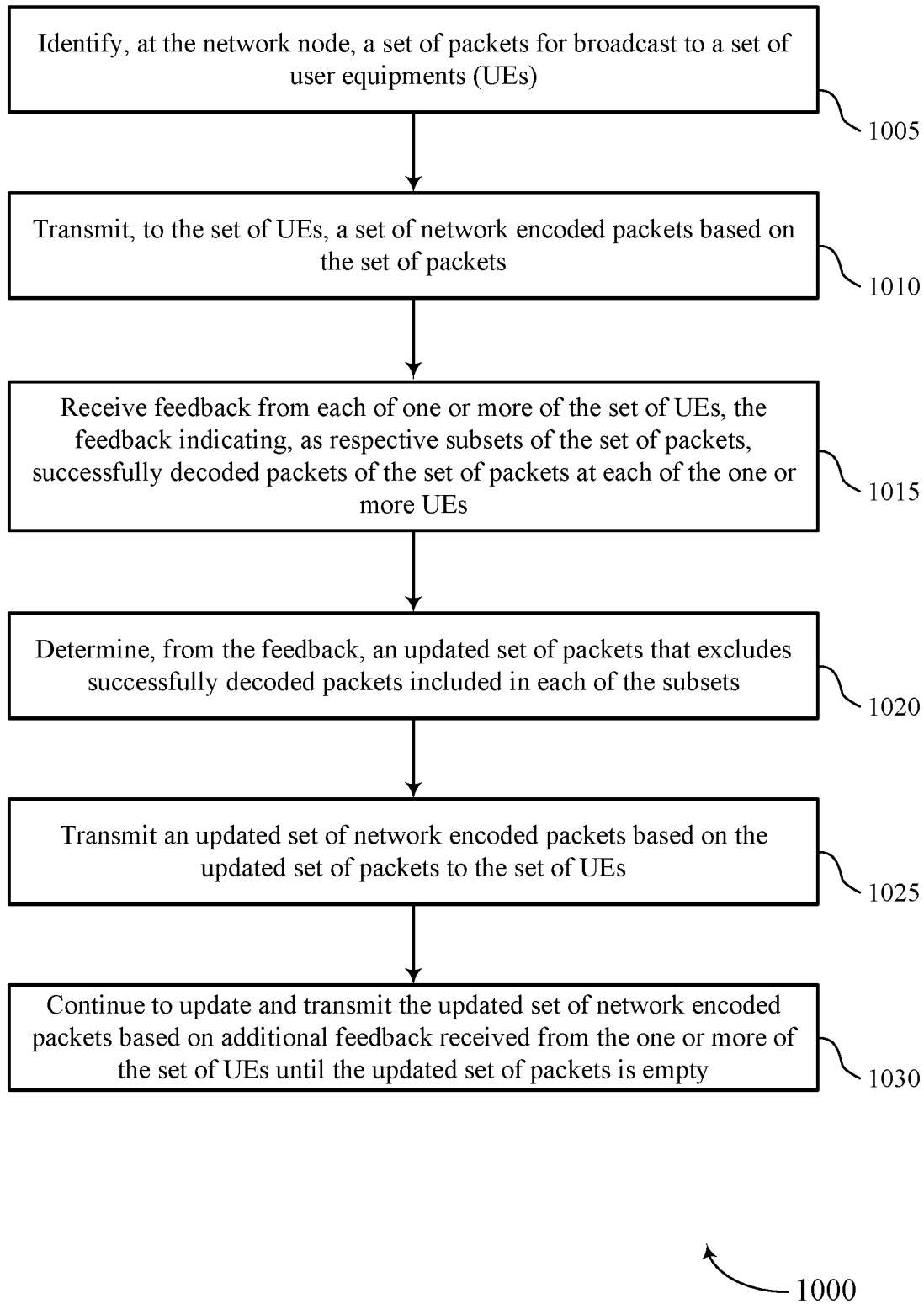
FIGS. 10 through 13 show flowcharts illustrating methods that support broadcasting packets using network coding with feedback in accordance with aspects of the present disclosure.

FIG. 10 shows a flowchart illustrating a method 1000 that supports broadcasting packets using network coding with feedback in accordance with aspects of the present disclosure. The operations of method 1000 may be implemented by a network entity or its components as described herein. For example, the operations of method 1000 may be performed by a communications manager as described with reference to FIGS. 6 through 9. In some examples, a network entity may execute a set of instructions to control the functional elements of the network entity to perform the functions described below. Additionally or alternatively, a network entity may perform aspects of the functions described below using special-purpose hardware.

At 1005, the network entity may identify, at the network node, a set of packets for broadcast to a set of user equipments (UEs). The operations of 1005 may be performed according to the methods described herein. In some examples, aspects of the operations of 1005 may be performed by a packet identifier as described with reference to FIGS. 6 through 9.

At 1010, the network entity may transmit, to the set of UEs, a set of network encoded packets based on the set of packets. The operations of 1010 may be performed according to the methods described herein. In some examples, aspects of the operations of 1010 may be performed by a packet transmission interface as described with reference to FIGS. 6 through 9.

At 1015, the network entity may receive feedback from each of one or more of the set of UEs, the feedback indicating, as respective subsets of the set of packets, successfully decoded packets of the set of packets at each of the one or more UEs. The operations of 1015 may be performed according to the methods described herein. In some examples, aspects of the operations of 1015 may be performed by a feedback interface as described with reference to FIGS. 6 through 9.

At 1020, the network entity may determine, from the feedback, an updated set of packets that excludes successfully decoded packets included in each of the subsets. The operations of 1020 may be performed according to the methods described herein. In some examples, aspects of the operations of 1020 may be performed by a packet set updating component as described with reference to FIGS. 6 through 9.

At 1025, the network entity may transmit an updated set of network encoded packets based on the updated set of packets to the set of UEs. The operations of 1025 may be performed according to the methods described herein. In some examples, aspects of the operations of 1025 may be performed by a packet transmission interface as described with reference to FIGS. 6 through 9.

At 1030, the network entity may continue to update and transmit the updated set of network encoded packets based on additional feedback received from the one or more of the set of UEs until the updated set of packets is empty. The operations of 1030 may be performed according to the methods described herein. In some examples, aspects of the operations of 1030 may be performed by a feedback monitoring component as described with reference to FIGS. 6 through 9.

Figure 11:
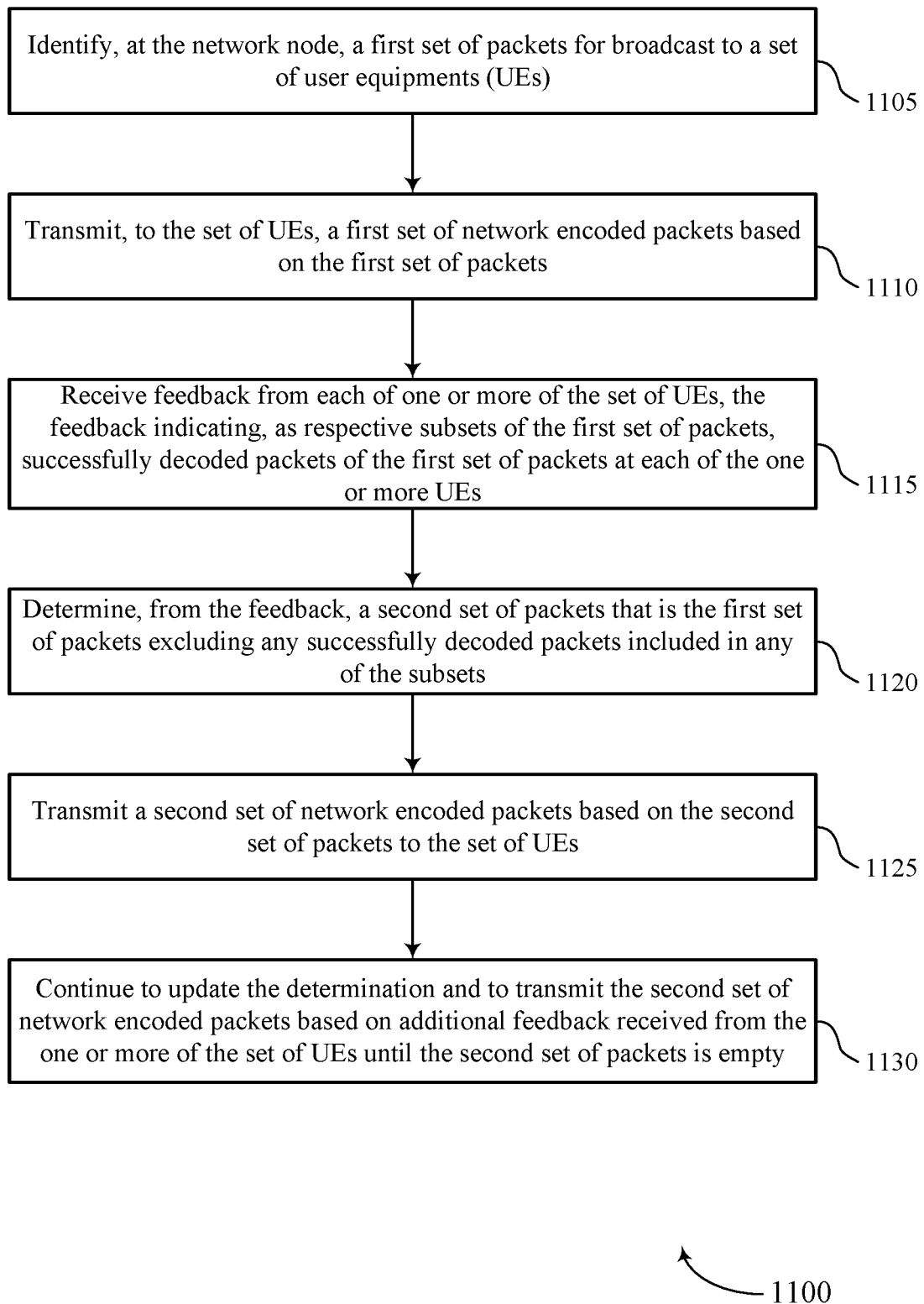

FIG. 11 shows a flowchart illustrating a method 1100 that supports broadcasting packets using network coding with feedback in accordance with aspects of the present disclosure. The operations of method 1100 may be implemented by a network entity or its components as described herein. For example, the operations of method 1100 may be performed by a communications manager as described with reference to FIGS. 6 through 9. In some examples, a network entity may execute a set of instructions to control the functional elements of the network entity to perform the functions described below. Additionally or alternatively, a network entity may perform aspects of the functions described below using special-purpose hardware.

At 1105, the network entity may identify, at the network node, a first set of packets for broadcast to a set of user equipments (UEs). The operations of 1105 may be performed according to the methods described herein. In some examples, aspects of the operations of 1105 may be performed by a packet identifier as described with reference to FIGS. 6 through 9.

At 1110, the network entity may transmit, to the set of UEs, a first set of network encoded packets based on the first set of packets. The operations of 1110 may be performed according to the methods described herein. In some examples, aspects of the operations of 1110 may be performed by a packet transmission interface as described with reference to FIGS. 6 through 9.

At 1115, the network entity may receive feedback from each of one or more of the set of UEs, the feedback indicating, as respective subsets of the first set of packets, successfully decoded packets of the first set of packets at each of the one or more UEs. The operations of 1115 may be performed according to the methods described herein. In some examples, aspects of the operations of 1115 may be performed by a feedback interface as described with reference to FIGS. 6 through 9.

At 1120, the network entity may determine, from the feedback, a second set of packets that is the first set of packets excluding any successfully decoded packets included in any of the subsets. The operations of 1120 may be performed according to the methods described herein. In some examples, aspects of the operations of 1120 may be performed by a packet set updating component as described with reference to FIGS. 6 through 9.

At 1125, the network entity may transmit a second set of network encoded packets based on the second set of packets to the set of UEs. The operations of 1125 may be performed according to the methods described herein. In some examples, aspects of the operations of 1125 may be performed by a packet transmission interface as described with reference to FIGS. 6 through 9.

At 1130, the network entity may continue to update the determination and to transmit the second set of network encoded packets based on additional feedback received from the one or more of the set of UEs until the second set of packets is empty. The operations of 1130 may be performed according to the methods described herein. In some examples, aspects of the operations of 1130 may be performed by a feedback monitoring component as described with reference to FIGS. 6 through 9.

Figure 12:
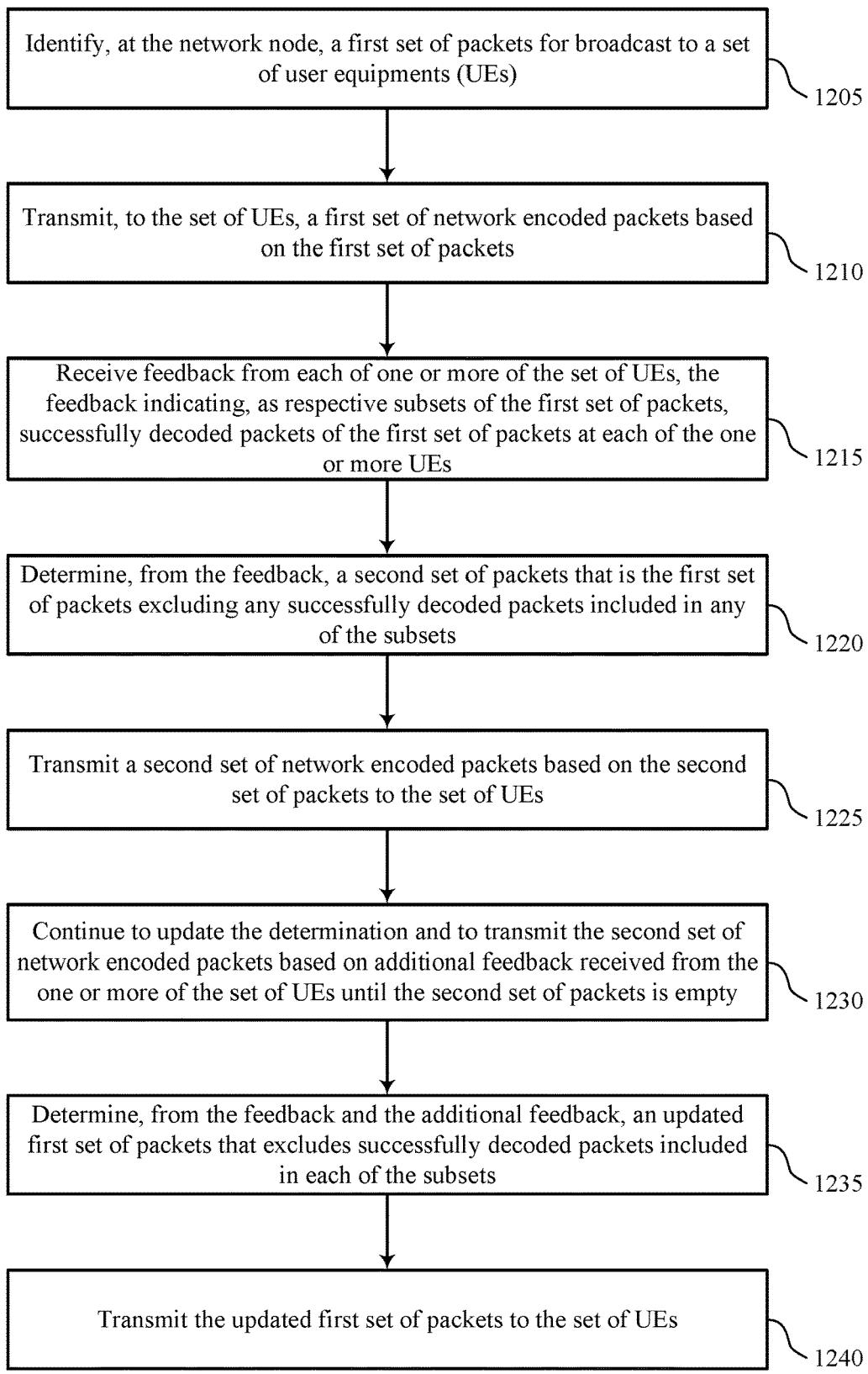

FIG. 12 shows a flowchart illustrating a method 1200 that supports broadcasting packets using network coding with feedback in accordance with aspects of the present disclosure. The operations of method 1200 may be implemented by a network entity or its components as described herein. For example, the operations of method 1200 may be performed by a communications manager as described with reference to FIGS. 6 through 9. In some examples, a network entity may execute a set of instructions to control the functional elements of the network entity to perform the functions described below. Additionally or alternatively, a network entity may perform aspects of the functions described below using special-purpose hardware.

At 1205, the network entity may identify, at the network node, a first set of packets for broadcast to a set of user equipments (UEs). The operations of 1205 may be performed according to the methods described herein. In some examples, aspects of the operations of 1205 may be performed by a packet identifier as described with reference to FIGS. 6 through 9.

At 1210, the network entity may transmit, to the set of UEs, a first set of network encoded packets based on the first set of packets. The operations of 1210 may be performed according to the methods described herein. In some examples, aspects of the operations of 1210 may be performed by a packet transmission interface as described with reference to FIGS. 6 through 9.

At 1215, the network entity may receive feedback from each of one or more of the set of UEs, the feedback indicating, as respective subsets of the first set of packets, successfully decoded packets of the first set of packets at each of the one or more UEs. The operations of 1215 may be performed according to the methods described herein. In some examples, aspects of the operations of 1215 may be performed by a feedback interface as described with reference to FIGS. 6 through 9.

At 1220, the network entity may determine, from the feedback, a second set of packets that is the first set of packets excluding any successfully decoded packets included in any of the subsets. The operations of 1220 may be performed according to the methods described herein. In some examples, aspects of the operations of 1220 may be performed by a packet set updating component as described with reference to FIGS. 6 through 9.

At 1225, the network entity may transmit a second set of network encoded packets based on the second set of packets to the set of UEs. The operations of 1225 may be performed according to the methods described herein. In some examples, aspects of the operations of 1225 may be performed by a packet transmission interface as described with reference to FIGS. 6 through 9.

At 1230, the network entity may continue to update the determination and to transmit the second set of network encoded packets based on additional feedback received from the one or more of the set of UEs until the second set of packets is empty. The operations of 1230 may be performed according to the methods described herein. In some examples, aspects of the operations of 1230 may be performed by a feedback monitoring component as described with reference to FIGS. 6 through 9.

At 1235, the network entity may determine, from the feedback and the additional feedback, an updated first set of packets that excludes successfully decoded packets included in each of the subsets. The operations of 1235 may be performed according to the methods described herein. In some examples, aspects of the operations of 1235 may be performed by a packet set updating component as described with reference to FIGS. 6 through 9.

At 1240, the network entity may transmit the updated first set of packets to the set of UEs. The operations of 1240 may be performed according to the methods described herein. In some examples, aspects of the operations of 1240 may be performed by a packet transmission interface as described with reference to FIGS. 6 through 9.

Figure 13:
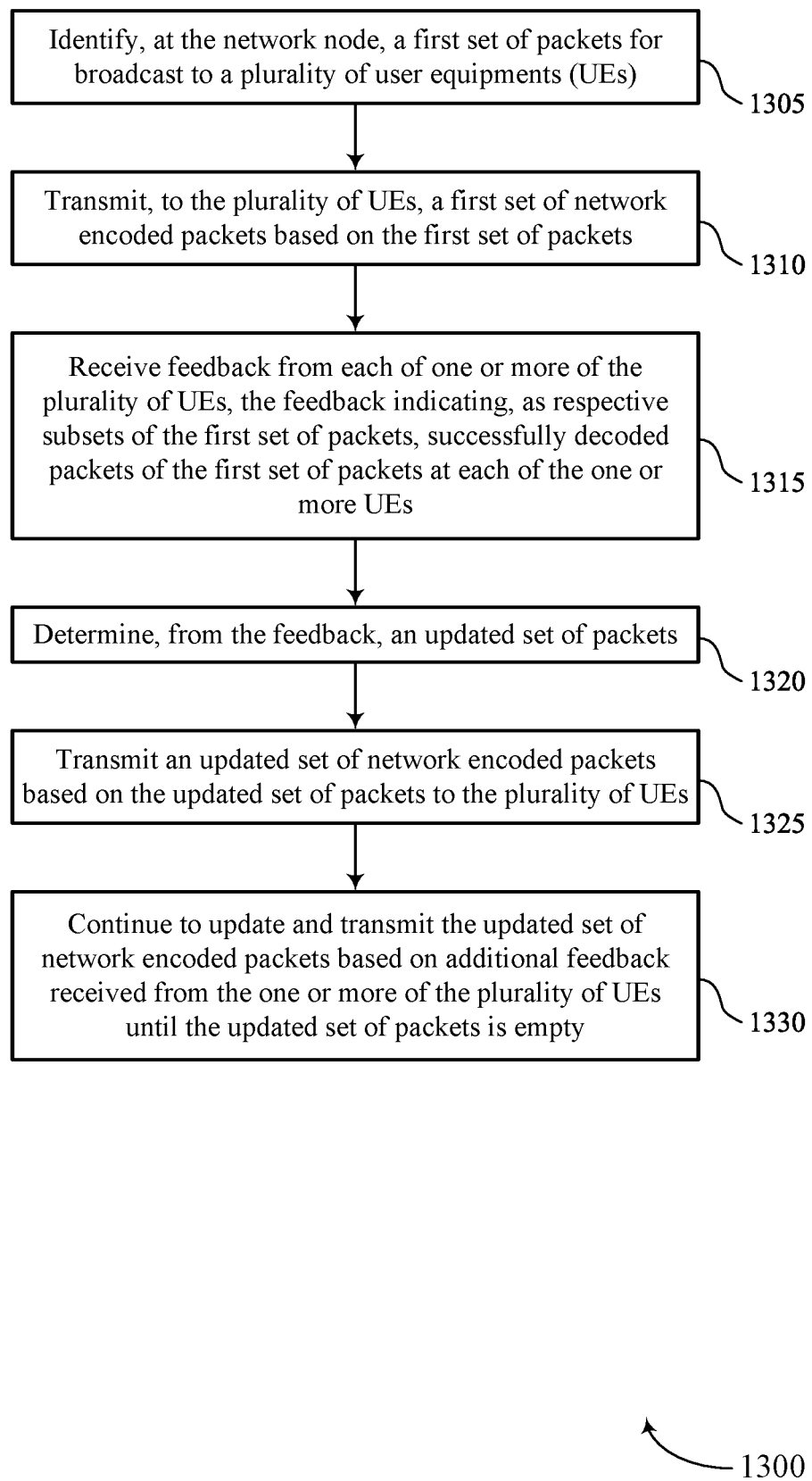

FIG. 13 shows a flowchart illustrating a method 1300 that supports broadcasting packets using network coding with feedback in accordance with aspects of the present disclosure. The operations of the method 1300 may be implemented by a network entity or its components as described herein. For example, the operations of the method 1300 may be performed by a communications manager as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 1305, the method may include identifying, at the network node, a first set of packets for broadcast to a set of multiple user equipments (UEs). The operations of 1305 may be performed in accordance with examples as disclosed herein. In some examples, aspects of the operations of 1305 may be performed by a packet identifier as described with reference to FIGS. 6 through 9.

At 1310, the method may include transmitting, to the set of multiple UEs, a first set of network encoded packets based on the first set of packets. The operations of 1310 may be performed in accordance with examples as disclosed herein. In some examples, aspects of the operations of 1310 may be performed by a packet transmission interface as described with reference to FIGS. 6 through 9.

At 1315, the method may include receiving feedback from each of one or more of the set of multiple UEs, the feedback indicating, as respective subsets of the first set of packets, successfully decoded packets of the first set of packets at each of the one or more UEs. The operations of 1315 may be performed in accordance with examples as disclosed herein. In some examples, aspects of the operations of 1315 may be performed by a feedback interface as described with reference to FIGS. 6 through 9.

At 1320, the method may include determining, from the feedback, an updated set of packets. The operations of 1320 may be performed in accordance with examples as disclosed herein. In some examples, aspects of the operations of 1320 may be performed by a packet set updating component as described with reference to FIGS. 6 through 9.

At 1325, the method may include transmitting an updated set of network encoded packets based on the updated set of packets to the set of multiple UEs. The operations of 1325 may be performed in accordance with examples as disclosed herein. In some examples, aspects of the operations of 1325 may be performed by a packet transmission interface as described with reference to FIGS. 6 through 9.

At 1330, the method may include continuing to update and transmit the updated set of network encoded packets based on additional feedback received from the one or more of the set of multiple UEs until the updated set of packets is empty. The operations of 1330 may be performed in accordance with examples as disclosed herein. In some examples, aspects of the operations of 1330 may be performed by a feedback monitoring component as described with reference to FIGS. 6 through 9.

The following provides a first overview of aspects of the present disclosure:

Aspect 1: A method for wireless communication at a network node, comprising: identifying, at the network node, a set of packets for broadcast to a plurality of user equipments (UEs); transmitting, to the plurality of UEs, a set of network encoded packets based on the set of packets; receiving feedback from each of one or more of the plurality of UEs, the feedback indicating, as respective subsets of the set of packets, successfully decoded packets of the set of packets at each of the one or more UEs; determining, from the feedback, an updated set of packets that excludes successfully decoded packets included in each of the subsets; transmitting an updated set of network encoded packets based on the updated set of packets to the plurality of UEs; and continuing to update and transmit the updated set of network encoded packets based on additional feedback received from the one or more of the plurality of UEs until the updated set of packets is empty.

Aspect 2: The method of aspect 1, wherein determining the updated set of packets comprises: determining an intersection of each of the subsets to identify the successfully decoded packets included in each of the subsets.

Aspect 3: The method of any one of aspects 1 through 2, wherein receiving the feedback comprises: receiving the feedback via a packet data convergence protocol (PDCP) status report, a radio link control (RLC) status report, or a hybrid automatic repeat request (HARQ) message.

Aspect 4: The method of any one of aspects 1 through 3, wherein receiving the feedback comprises: receiving the feedback or the additional feedback in a network coding sub-layer, wherein the feedback indicates a decoding status of each packet of the set of packets.

Aspect 5: The method of any one of aspects 1 through 4, further comprising: receiving a channel state information message in conjunction with the feedback or the additional feedback; and determining one or more encoding metrics for transmission of the updated set of packets based at least in part on the channel state information message.

Aspect 6: The method of aspect 5, wherein determining the one or more encoding metrics comprises: determining a modulation and coding scheme, an encoding rate, or a combination thereof.

Aspect 7: The method of any one of aspects 5 through 6, wherein receiving the channel state information message comprises: receiving the channel state information message based at least in part on the feedback indicating a negative acknowledgement for one or more of the set of packets.

Aspect 8: The method of any one of aspects 1 through 7, further comprising: transmitting, to one or more of the plurality of UEs, an indication of one or more network coding parameters, wherein at least the updated set of network encoded packets are transmitted to the plurality of UEs in accordance with the one or more network coding parameters.

Aspect 9: The method of aspect 8, wherein transmitting the indication of the one or more network coding parameters comprises: transmitting an indication of a network coding algorithm, a network encoding function, a network encoding matrix, a number of decoding iterations, or a combination thereof.

Aspect 10: The method of any one of aspects 8 through 9, wherein transmitting the indication of the one or more network coding parameters comprises: transmitting the one or more network coding parameters using medium access control-control element (MAC-CE) signaling or downlink control information signaling.

Aspect 11: The method of any one of aspects 8 through 10, wherein transmitting the indication of the one or more network coding parameters comprises: transmitting the one or more network coding parameters using radio resource control signaling.

Aspect 12: The method of any one of aspects 8 through 11, wherein transmitting the indication of the one or more network coding parameters comprises: transmitting an update to the one or more network coding parameters using radio resource control signaling.

Aspect 13: The method of any one of aspects 8 through 12, wherein transmitting the indication of the one or more network coding parameters comprises: transmitting an indication to switch from one or more prior network coding parameters to the one or more network coding parameters.

Aspect 14: The method of any one of aspects 8 through 13, further comprising: receiving, from the one or more of the plurality of UEs, a request for the one or more network coding parameters, wherein the indication of the one or more network coding parameters is transmitted based at least in part on receiving the request.

Aspect 15: The method of aspect 14, wherein receiving the request comprises: receiving, the request using medium access control-control element (MAC-CE) signaling or uplink control information signaling.

Aspect 16: The method of one of aspects 1 through 15, wherein identifying the set of packets comprises: identifying the set of packets from a packet pool scheduled for broadcast to the plurality of UEs.

Aspect 17: The method of aspect 16, further comprising: identifying one or more additional packets for broadcast to the plurality of UEs based at least in part on the one or more additional packets being added to the packet pool.

Aspect 18: The method of any one of aspects 1 through 17, further comprising: encoding the set of packets using an encoding function for transmission to the plurality of UEs; and encoding the updated set of packets using the encoding function for transmission to the plurality of UEs.

Aspect 19: The method of aspect 18 aspect, wherein the encoding function comprises a matrix and each row of the matrix indicates a combination of packets.

Aspect 20: An apparatus for wireless communication at a network node comprising at least one means for performing a method of any one of aspects 1 through 19.

Aspect 21: An apparatus for wireless communication at a network node comprising a processor and memory coupled to the processor, the processor and memory configured to perform a method of any one of aspects 1 through 19.

Aspect 22: A non-transitory computer-readable medium storing code for wireless communication at a network node, the code comprising instructions executable by a processor to perform a method of any one of aspects 1 through 19.

The following provides a second overview of aspects of the present disclosure.

Aspect 1: A method for wireless communication, comprising: identifying, at the network node, a first set of packets for broadcast to a plurality of user equipments (UEs); transmitting, to the plurality of UEs, a first set of network encoded packets based on the first set of packets; receiving feedback from each of one or more of the plurality of UEs, the feedback indicating, as respective subsets of the first set of packets, successfully decoded packets of the first set of packets at each of the one or more UEs; determining, from the feedback, a second set of packets that is the first set of packets excluding any successfully decoded packets included in any of the subsets; transmitting a second set of network encoded packets based on the second set of packets to the plurality of UEs; and continuing to update the determination and to transmit the second set of network encoded packets based on additional feedback received from the one or more of the plurality of UEs until the second set of packets is empty.

Aspect 2: The method of aspect 1, further comprising: determining, from the feedback and the additional feedback, an updated first set of packets that excludes successfully decoded packets included in each of the subsets; and transmitting the updated first set of packets to the plurality of UEs.

Aspect 3: The method of any one of aspects 1 through 2, wherein determining the second subset of packets comprises: determining a union of each of the subsets, wherein the second subset is the first subset excluding the subset union.

Aspect 4: The method of any one of aspects 1 through 3, wherein receiving the feedback comprises: receiving the feedback via a packet data convergence protocol (PDCP) status report, a radio link control (RLC) status report, or a hybrid automatic repeat request (HARQ) message.

Aspect 5: The method of any one of aspects 1 through 3, wherein receiving the feedback comprises: receiving the feedback or the additional feedback in a network coding sub-layer, wherein the feedback indicates a decoding status of each packet of the first subset.

Aspect 6: The method of any one of aspects 1 through 5, further comprising: receiving a channel state information message in conjunction with the feedback or the additional feedback; and determining one or more encoding metrics for transmission of the updated first set of packets based at least in part on the channel state information message.

Aspect 7: The method of aspect 6, wherein determining the one or more encoding metrics comprises: determining a modulation and coding scheme, an encoding rate, or a combination thereof.

Aspect 8: The method of any one of aspects 6 through 7, wherein receiving the channel state information message comprises: receiving the channel state information message based at least in part on the feedback indicating a negative acknowledgement for one or more of the first set of packets.

Aspect 9: The method of any one of aspects 1 through 8, further comprising: transmitting, to one or more of the plurality of UEs, an indication of one or more network coding parameters, wherein at least the second set of network encoded packets are transmitted to the plurality of UEs in accordance with the one or more network coding parameters.

Aspect 10: The method of aspect 9, wherein transmitting the indication of the one or more network coding parameters comprises: transmitting an indication of a network coding algorithm, a network encoding function, a network encoding matrix, a number of decoding iterations, or a combination thereof.

Aspect 11: The method of any one of aspects 9 through 10, wherein transmitting the indication of the one or more network coding parameters comprises: transmitting the one or more network coding parameters using medium access control-control element (MAC-CE) signaling or downlink control information signaling.

Aspect 12: The method of any one of aspects 9 through 11, wherein transmitting the indication of the one or more network coding parameters comprises: transmitting the one or more network coding parameters using radio resource control signaling.

Aspect 13: The method of any one of aspects 9 through 12, wherein transmitting the indication of the one or more network coding parameters comprises: transmitting an update to the one or more network coding parameters using radio resource control signaling.

Aspect 14: The method of any one of aspects 9 through 13, wherein transmitting the indication of the one or more network coding parameters comprises: transmitting an indication to switch from one or more prior network coding parameters to the one or more network coding parameters.

Aspect 15: The method of any one of aspects 9 through 14, further comprising: receiving, from the one or more of the plurality of UEs, a request for the one or more network coding parameters, wherein the indication of the one or more network coding parameters is transmitted based at least in part on receiving the request.

Aspect 16: The method of aspect 15, wherein receiving the request comprises: receiving, the request using medium access control-control element (MAC-CE) signaling or uplink control information signaling.

Aspect 17: The method of any one of aspects 1 through 16, wherein identifying the first set of packets comprises: identifying the first set of packets from a packet pool scheduled for broadcast to the plurality of UEs.

Aspect 18: The method of any one of aspects 17 through 17, further comprising: identifying one or more additional packets for broadcast to the plurality of UEs based at least in part on the one or more additional packets being added to the packet pool.

Aspect 19: The method of any one of aspects 1 through 18, further comprising: encoding the first set of packets using an encoding function for transmission to the plurality of UEs; and encoding the updated first set of packets using the encoding function for transmission to the plurality of UEs.

Aspect 20: The method of aspect 19, wherein the encoding function comprises a matrix and each row of the matrix indicates a combination of packets.

Aspect 21: An apparatus for wireless communication comprising at least one means for performing a method of any one of aspects 1 through 20.

Aspect 22: An apparatus for wireless communication comprising a processor and memory coupled to the processor, the processor and memory configured to perform a method of any one of aspects 1 through 20.

Aspect 23: A non-transitory computer-readable medium storing code for wireless communication, the code comprising instructions executable by a processor to perform a method of any one of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network node, comprising:
   identifying, at the network node, a set of packets for broadcast to a plurality of user equipments (UEs), each packet of the set of packets intended for each UE of the plurality of UEs;
   transmitting, to the plurality of UEs and prior to receiving feedback associated with the set of packets, a set of network encoded packets based on the set of packets;
   receiving the feedback from each of one or more of the plurality of UEs, the feedback indicating, as respective subsets of the set of packets, successfully decoded packets of the set of packets at each of the one or more UEs;
   determining, from the feedback, an updated set of packets;
   transmitting an updated set of network encoded packets based on the updated set of packets to the plurality of UEs; and
   continuing to update and transmit the updated set of network encoded packets based on additional feedback received from the one or more of the plurality of UEs until the updated set of packets is empty.

2. The method of claim 1, wherein:
   the updated set of packets excludes successfully decoded packets included in each of the subsets; and
   determining the updated set of packets comprises determining an intersection of each of the subsets to identify the successfully decoded packets included in each of the subsets.

3. The method of claim 1, further comprising:
   determining, from the feedback and the additional feedback and after the updated set of packets is empty, an updated second set of packets that excludes successfully decoded packets included in each of the subsets; and
   transmitting the updated second set of packets to the plurality of UEs.

4. The method of claim 1, wherein:
   the updated set of packets is the set of packets excluding any successfully decoded packets included in any of the subsets; and
   determining the updated set of packets comprises determining a union of each of the subsets.

5. The method of claim 1, wherein receiving the feedback comprises:
   receiving the feedback via a packet data convergence protocol (PDCP) status report, a radio link control (RLC) status report, or a hybrid automatic repeat request (HARD) message.

6. The method of claim 1, wherein receiving the feedback comprises:
   receiving the feedback or the additional feedback in a network coding sub-layer, wherein the feedback indicates a decoding status of each packet of the set of packets.

7. The method of claim 1, further comprising:
   receiving a channel state information message in conjunction with the feedback or the additional feedback; and
   determining one or more encoding metrics for transmission of the updated set of packets based at least in part on the channel state information message.

8. The method of claim 7, wherein determining the one or more encoding metrics comprises:
   determining a modulation and coding scheme, an encoding rate, or a combination thereof.

9. The method of claim 7, wherein receiving the channel state information message comprises:
   receiving the channel state information message based at least in part on the feedback indicating a negative acknowledgement for one or more of the set of packets.

10. The method of claim 1, further comprising:
   transmitting, to one or more of the plurality of UEs, an indication of one or more network coding parameters, wherein at least the updated set of network encoded packets are transmitted to the plurality of UEs in accordance with the one or more network coding parameters.

11. The method of claim 10, wherein transmitting the indication of the one or more network coding parameters comprises:
   transmitting an indication of a network coding algorithm, a network encoding function, a network encoding matrix, a number of decoding iterations, or a combination thereof.

12. The method of claim 10, wherein transmitting the indication of the one or more network coding parameters comprises:
   transmitting the one or more network coding parameters using medium access control-control element (MAC-CE) signaling or downlink control information signaling.

13. The method of claim 10, wherein transmitting the indication of the one or more network coding parameters comprises:
   transmitting the one or more network coding parameters using radio resource control signaling.

14. The method of claim 10, wherein transmitting the indication of the one or more network coding parameters comprises:
   transmitting an update to the one or more network coding parameters using radio resource control signaling.

15. The method of claim 10, wherein transmitting the indication of the one or more network coding parameters comprises:
   transmitting an indication to switch from one or more prior network coding parameters to the one or more network coding parameters.

16. The method of claim 10, further comprising:
   receiving, from the one or more of the plurality of UEs, a request for the one or more network coding parameters, wherein the indication of the one or more network coding parameters is transmitted based at least in part on receiving the request.

17. The method of claim 16, wherein receiving the request comprises:
   receiving, the request using medium access control-control element (MAC-CE) signaling or uplink control information signaling.

18. The method of claim 1, wherein identifying the set of packets comprises:
   identifying the set of packets from a packet pool scheduled for broadcast to the plurality of UEs.

19. The method of claim 18, further comprising:
   identifying one or more additional packets for broadcast to the plurality of UEs based at least in part on the one or more additional packets being added to the packet pool.

20. The method of claim 1, further comprising:
   encoding the set of packets using an encoding function for transmission to the plurality of UEs; and
   encoding the updated set of packets using the encoding function for transmission to the plurality of UEs.

21. The method of claim 20, wherein the encoding function comprises a matrix and each row of the matrix indicates a combination of packets.

22. A network node for wireless communication, comprising:
   a processor,
   memory coupled with the processor; and
   instructions stored in the memory and executable by the processor to cause the network node to:
      identify, at the network node, a set of packets for broadcast to a plurality of user equipments (UEs), each packet of the set of packets intended for each UE of the plurality of UEs;
      transmit, to the plurality of UEs and prior to receipt of feedback associated with the set of packets, a set of network encoded packets based on the set of packets;
      receive the feedback from each of one or more of the plurality of UEs, the feedback indicating, as respective subsets of the set of packets, successfully decoded packets of the set of packets at each of the one or more UEs;
      determine, from the feedback, an updated set of packets;
      transmit an updated set of network encoded packets based on the updated set of packets to the plurality of UEs; and
      continue to update and transmit the updated set of network encoded packets based on additional feedback received from the one or more of the plurality of UEs until the updated set of packets is empty.

23. The network node of claim 22, wherein:
   the updated set of packets excludes successfully decoded packets included in each of the subsets; and
   the instructions to determine the updated set of packets are executable by the processor to cause the network node to determine an intersection of each of the subsets to identify the successfully decoded packets included in each of the subsets.

24. The network node of claim 22, wherein:
   the updated set of packets is the set of packets excluding any successfully decoded packets included in any of the subsets; and
   the instructions to determine the updated set of packets are executable by the processor to cause the network node to determine a union of each of the subsets.

25. A network node for wireless communication, comprising:
   means for identifying, at the network node, a set of packets for broadcast to a plurality of user equipments (UEs), each packet of the set of packets intended for each UE of the plurality of UEs;
   means for transmitting, to the plurality of UEs and prior to receipt of feedback associated with the set of packets, a set of network encoded packets based on the set of packets;
   means for receiving the feedback from each of one or more of the plurality of UEs, the feedback indicating, as respective subsets of the set of packets, successfully decoded packets of the set of packets at each of the one or more UEs;
   means for determining, from the feedback, an updated set of packets;

means for transmitting an updated set of network encoded packets based on the updated set of packets to the plurality of UEs; and means for continuing to update and transmit the updated set of network encoded packets based on additional feedback received from the one or more of the plurality of UEs until the updated set of packets is empty.

26. The network node of claim 25, wherein:

the updated set of packets excludes successfully decoded packets included in each of the subsets; and the means for determining the updated set of packets comprises means for determining an intersection of each of the subsets to identify the successfully decoded packets included in each of the subsets.

27. The network node of claim 25, wherein:

the updated set of packets is the set of packets excluding any successfully decoded packets included in any of the subsets; and the means for determining the updated set of packets comprises means for determining a union of each of the subsets.

28. A non-transitory computer-readable medium storing code for wireless communication at a network node, the code comprising instructions executable by a processor to:

identify, at the network node, a set of packets for broadcast to a plurality of user equipments (UEs), each packet of the set of packets intended for each UE of the plurality of UEs;

transmit, to the plurality of UEs and prior to receipt of feedback associated with the set of packets, a set of network encoded packets based on the set of packets;

receive the feedback from each of one or more of the plurality of UEs, the feedback indicating, as respective subsets of the set of packets, successfully decoded packets of the set of packets at each of the one or more UEs;

determine, from the feedback, an updated set of packets;

transmit an updated set of network encoded packets based on the updated set of packets to the plurality of UEs; and continue to update and transmit the updated set of network encoded packets based on additional feedback received from the one or more of the plurality of UEs until the updated set of packets is empty.

29. The non-transitory computer-readable medium of claim 28, wherein:

the updated set of packets excludes successfully decoded packets included in each of the subsets; and the instructions to determine the updated set of packets are executable to determine an intersection of each of the subsets to identify the successfully decoded packets included in each of the subsets.

30. The non-transitory computer-readable medium of claim 28, wherein:

the updated set of packets is the set of packets excluding any successfully decoded packets included in any of the subsets; and the instructions to determine the updated set of packets are executable to determine a union of each of the subsets.

\* \* \* \* \*